(12) United States Patent
Zhang et al.

(10) Patent No.: US 12,395,271 B2
(45) Date of Patent: Aug. 19, 2025

(54) DATA RETRANSMISSION METHOD, DATA RETRANSMISSION APPARATUS, TARGET NODE, SOURCE NODE, AND TERMINAL

(71) Applicant: VIVO MOBILE COMMUNICATION CO., LTD., Guangdong (CN)

(72) Inventors: Yanxia Zhang, Guangdong (CN); Zhenhua Xie, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 312 days.

(21) Appl. No.: 17/968,665

(22) Filed: Oct. 18, 2022

(65) Prior Publication Data

US 2023/0039646 A1 Feb. 9, 2023

Related U.S. Application Data

(63) Continuation of application No. PCT/CN2021/089120, filed on Apr. 23, 2021.

(30) Foreign Application Priority Data

Apr. 30, 2020 (CN) .................. 202010367115.X

(51) Int. Cl.
*H04H 20/71* (2008.01)
*H04L 1/08* (2006.01)
*H04W 72/30* (2023.01)

(52) U.S. Cl.
CPC .............. *H04L 1/08* (2013.01); *H04W 72/30* (2023.01)

(58) Field of Classification Search
USPC ....................................... 370/312
See application file for complete search history.

(56) References Cited

U.S. PATENT DOCUMENTS

| | | | |
|---|---|---|---|
| 2009/0086677 A1 | 4/2009 | Ho | |
| 2010/0177739 A1* | 7/2010 | Huang | H04W 36/0011 370/331 |
| 2015/0264615 A1 | 9/2015 | Zhao et al. | |
| 2016/0066222 A1 | 3/2016 | Makinen et al. | |
| 2017/0055313 A1* | 2/2017 | Sharma | H04W 36/0066 |
| 2017/0332245 A1 | 11/2017 | Huang et al. | |
| 2019/0230564 A1 | 7/2019 | Kim et al. | |
| 2020/0336960 A1* | 10/2020 | Park | H04W 8/08 |

(Continued)

FOREIGN PATENT DOCUMENTS

| | | |
|---|---|---|
| CN | 101843138 A | 9/2010 |
| CN | 103533586 A | 1/2014 |

(Continued)

OTHER PUBLICATIONS

Foreign Office Action First Office Action for Chinese Application No. 202010367115.X, dated Mar. 16, 2022, 11 Pages.

(Continued)

*Primary Examiner* — Chuong T Ho

(74) *Attorney, Agent, or Firm* — BROOKS KUSHMAN P.C.

(57) ABSTRACT

Data retransmission method is disclosed. The method includes: obtaining a mapping relationship between GTP-U sequence numbers of N data packets sent by a source node and source PDCP sequence numbers assigned to the N data packets by the source node; and performing data retransmission based on the mapping relationship.

18 Claims, 5 Drawing Sheets

(56) References Cited

U.S. PATENT DOCUMENTS

2021/0377816 A1* 12/2021 Yan .................. H04W 36/0064
2022/0256427 A1*  8/2022 Chen ................. H04W 36/0044

FOREIGN PATENT DOCUMENTS

| CN | 105578548 | A  |  5/2016 |
|----|-----------|----|---------|
| CN | 107078968 | A  |  8/2017 |
| CN | 107211276 | A  |  9/2017 |
| CN | 107925905 | A  |  4/2018 |
| CN | 108551681 | A  |  9/2018 |
| CN | 110475299 | A  | 11/2019 |
| CN | 110620640 | A  | 12/2019 |
| EP |   3355617 | A1 |  8/2018 |

OTHER PUBLICATIONS

International Search Report and Written Opinion International Search Report and Written Opinion for Application No. PCT/CN2021/089120, dated Jul. 8, 2021, 8 Pages.

First Office Action for Korean Application No. 10-2022-7041248, dated Feb. 21, 2025, 12 Pages (incl. English translation).

Panasonic, "Ue Authorization for SC-PTP Mobility," 3GPP Tsg Ran WG3 #56, Agenda item 13.2.2.14 c), May 7-11, 2007, R3-070975, Kobe, Japan, 3 pages.

3GPP, "3rd Generation Partnership Project; Technical Specification Group Radio Access Network; Evolved Universal Terrestrial Radio Access (E-UTRA); Radio Resource Control (RRC); Protocol Specification (Release 16)," 3GPP TS 36.331, Mar. 2020, V16.0.0, 1027 Pages (split into 7 parts).

* cited by examiner

DATA RETRANSMISSION METHOD, DATA RETRANSMISSION APPARATUS, TARGET NODE, SOURCE NODE, AND TERMINAL

CROSS-REFERENCE TO RELATED APPLICATIONS

This application is a continuation of PCT International Application No. PCT/CN2021/089120 filed on Apr. 23, 2021, which claims priority to Chinese Patent Application No. 202010367115.X, filed on Apr. 30, 2020, which are incorporated herein by reference in their entireties.

TECHNICAL FIELD

This application relates to the field of communications technologies, and specifically to a data retransmission method, a data retransmission apparatus, a target node, a source node, and a terminal.

BACKGROUND

Multimedia broadcast and multicast services (MBMS) or multicast broadcast services (MBS) have the following two transmission modes:

MBMS/MBS transmission mode 1: sending through a physical multicast channel (PMCH) in an MBMS single-frequency network (Multimedia Broadcast multicast service Single Frequency Network, MBSFN) subframe, where control information may be sent by using system information (for example, system information block SIB13) and a multicast control channel (MCCH), and data is sent by using a multicast traffic channel (MTCH).

MBMS/MBS transmission mode 2: sending through a physical downlink shared channel (PDSCH) that is scheduled by a physical downlink control channel (PDCCH), where control information is sent by using system information (for example, system information block SIB20) and a single-cell multicast control channel (SC-MCCH), and data is sent by using a single-cell multicast traffic channel (SC-MTCH). The SC-MCCH is sent through a PDSCH scheduled by a single-cell radio network temporary identity (SC-RNTI) PDCCH, and the SC-MTCH is sent through a PDSCH scheduled by a group radio network temporary identity (G-RNTI) PDCCH.

The MBS service is sent through a specific MBMS radio bearer (MRB). The MBS service may be denoted by the following identifiers:

temporary mobile group identity (TMGI); and
quality of service flow identifier (QoS flow ID).

In a case that a terminal is handed over from a cell providing multicast services in multicast mode to another cell providing services in multicast mode, part of data may be lost due to handover and/or asynchronous data transmission between the two cells. For example, data transmission of a source node and a target node is asynchronous (for example, the target node joins a multicast group later). The terminal has received a data packet with GTP-U SN (data packet identifier)=1, 2 at the source node, and the target node is sending a data packet with GTP-U SN=6 when the terminal is handed over to the target node. In this case, the terminal loses data packets with GTP-U SN=3, 4, 5 during the handover.

SUMMARY

According to a first aspect, an embodiment of this application provides a data retransmission method, performed by a target node and including:

obtaining a mapping relationship between GTP-U sequence numbers of N data packets sent by a source node and source PDCP sequence numbers assigned to the N data packets by the source node, where N is an integer greater than or equal to 1; and performing data retransmission based on the mapping relationship.

According to a second aspect, an embodiment of this application provides a data retransmission method, performed by a source node and including:

sending, to a target node, GTP-U sequence numbers of N data packets and source PDCP sequence numbers assigned to the N data packets by the source node, where N is an integer greater than or equal to 1.

According to a third aspect, an embodiment of this application provides a data retransmission method, performed by a terminal and including:

after being handed over to a target node, receiving, by the terminal, a data packet that is retransmitted by the target node based on a mapping relationship between GTP-U sequence numbers and source PDCP sequence numbers of data packets; where the source PDCP sequence number of the data packet is a PDCP sequence number assigned to the data packet by a source node.

According to a fourth aspect, an embodiment of this application provides a data retransmission apparatus, applied to a target node and including:

a relationship obtaining module, configured to obtain a mapping relationship between GTP-U sequence numbers of N data packets sent by a source node and source PDCP sequence numbers assigned to the N data packets by the source node, where N is an integer greater than or equal to 1; and a data retransmission module, configured to perform data retransmission based on the mapping relationship.

According to a fifth aspect, an embodiment of this application provides a data retransmission apparatus, applied to a source node and including:

a sending module, configured to send, to a target node, GTP-U sequence numbers of N data packets and source PDCP sequence numbers assigned to the N data packets by the source node, where N is an integer greater than or equal to 1.

According to a sixth aspect, an embodiment of this application provides a data retransmission apparatus, applied to a terminal and including:

a retransmission receiving module, configured to: after the terminal is handed over to a target node, receive a data packet that is retransmitted by the target node based on a mapping relationship between GTP-U sequence numbers and source PDCP sequence numbers of data packets; where the source PDCP sequence number of the data packet is a PDCP sequence number assigned to the data packet by a source node.

According to a seventh aspect, an embodiment of this application provides a communications device, where the communications device includes a processor, a memory, and a program or an instruction stored in the memory and capable of running on the processor, and when the program or the instruction is executed by the processor, the steps of the method according to the first aspect, the second aspect, or the third aspect are implemented.

According to an eighth aspect, an embodiment of the present application provides a readable storage medium, where a program or an instruction is stored in the readable storage medium. When the program or the instruction is executed by a processor, the steps of the method according to the first aspect, the second aspect, or the third aspect are implemented.

According to a ninth aspect, an embodiment of the present application provides a chip, where the chip comprises a processor and a communications interface, the communications interface is coupled to the processor, and the processor is configured to run a program or an instruction to implement the method according to the first aspect, the second aspect, or the third aspect.

According to a tenth aspect, an embodiment of this application further provides an electronic device, configured to perform the method according to the first aspect, the second aspect, or the third aspect.

According to an eleventh aspect, an embodiment of this application further provides a data retransmission apparatus, configured to perform the method according to the first aspect, the second aspect, or the third aspect.

According to a twelfth aspect, an embodiment of this application further provides a computer program product, where when the computer program product is executed by at least one processor, the method according to the first aspect, the second aspect, or the third aspect is implemented.

DETAILED DESCRIPTION

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

In the specification and claims of this application, the terms such as "first" and "second" are intended to distinguish between similar objects but do not necessarily indicate a specific order or sequence. It should be understood that the data used in this way is interchangeable in appropriate circumstances so that the embodiments of this application can be implemented in other orders than the order illustrated or described herein. In addition, in the specification and claims, "and/or" represents presence of at least one of connected objects, and the symbol "/" in this specification usually indicates an "or" relationship between associated objects.

The following describes the embodiments of this application with reference to the accompanying drawings. A data retransmission method, a data retransmission apparatus, a target node, a source node, and a terminal provided in the embodiments of this application may be applied to a wireless communications system. The wireless communications system may be a 5G system, an evolved long term evolution (eLTE) system, or a later evolved communications system.

The terminal provided in the embodiments of this application may be a mobile phone, a tablet computer, a notebook computer, an ultra-mobile personal computer (UMPC), a netbook, a wearable device, an in-vehicle device, a personal digital assistant (PDA), or the like. It should be noted that a specific type of the terminal is not limited in the embodiments of this application. In the embodiments of this application, the LTE and NR systems are used as examples. However, this is not limited to these systems, and the technical solutions provided in this application can be applied to other systems that have the same problem.

The following describes in detail a data retransmission method, a data retransmission apparatus, a target node, a source node, and a terminal provided in the embodiments of this application by using specific embodiments and application scenarios thereof with reference to the accompanying drawings.

Figure 1:
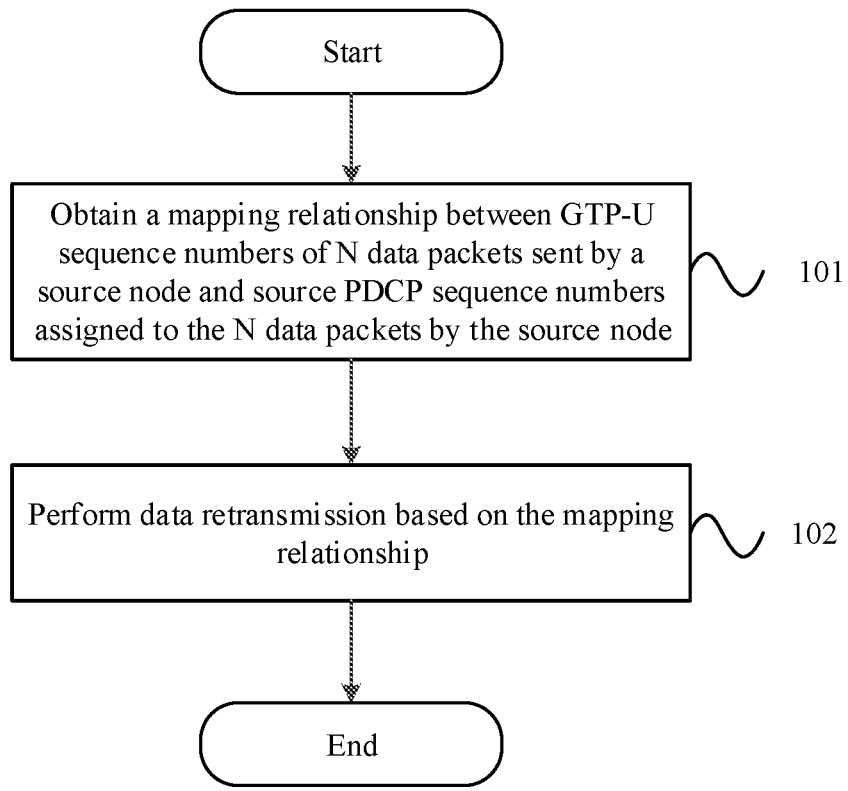
FIG. 1 is a first flowchart of steps of a data retransmission method according to an embodiment of this application.

As shown in FIG. 1, an embodiment of this application provides a data retransmission method, applied to a target node and including:

Step 101: Obtain a mapping relationship between GTP-U sequence numbers of N data packets sent by a source node and source PDCP sequence numbers assigned to the N data packets by the source node, where N is an integer greater than or equal to 1, the GTP-U sequence number means GPRS tunnelling protocol user plane sequence number (GTP-U sequence number, also referred to as GTP-U SN), and the PDCP sequence number means packet data convergence protocol sequence number (PDCP sequence number, also referred to as PDCP SN).

Step 102: Perform data retransmission based on the mapping relationship.

In this embodiment of this application, the source node and the target node are both network nodes that perform multicast transmission in multicast mode, and data loss is likely to occur during handover of a terminal from the source node to the target node. In this application, the target node performs data retransmission based on the mapping relationship between GTP-U sequence numbers and source PDCP sequence numbers, so as to reduce data loss for the terminal during handover and further meet service requirements of multicast services, resolving the problem of data loss for the terminal during handover.

In an optional embodiment of this application, step 102 includes:

performing data retransmission based on the mapping relationship by using a terminal-dedicated scheduling resource or a temporary scheduling resource.

The terminal-dedicated scheduling resource may be a wireless resource scheduled through terminal-dedicated scheduling (such as a C-RNTI of the terminal). The temporary scheduling resource may be a wireless resource scheduled through temporary scheduling (for example, a temporary G-RNTI assigned by the target node to the terminal, which is scheduling information different from that for transmitting a multicast service in multicast mode by the target node).

The target node performs data transmission based on the mapping relationship between GTP-U sequence numbers and source PDCP sequence numbers that is obtained from the source node. For example, for a pair of GTP-U SN=5 and source PDCP SN=5 indicated by the source node, the source node assigns PDCP SN=5 to a data packet, and then the target node reuses the PDCP SN=5 to retransmit data with GTP-U SN=5. In another case, for a pair of GTP-U SN=6 and PDCP SN=None indicated by the source node, the source node has not assigned a PDCP SN to a data packet; in this case, the target node needs to perform numbering in sequence, for example, to obtain PDCP SN=6, and then the target node uses the PDCP SN=6 to retransmit data with GTP-U SN=6.

In an optional embodiment, before step 102, the method further includes:
   obtaining reception status indication information of the terminal for a data packet sent by the source node, where the reception status indication information is used to indicate a source PDCP sequence number of at least one first data packet, and the first data packet is a data packet that has not been received by the terminal before node switching.

For example, the terminal actively sends a PDCP status report to the target node in a timely manner when or after establishing a connection to the target node, so that the target node can learn the reception status indication information of the terminal; or, the target node requests the terminal to or the source node instructs the terminal to send a PDCP status report to the target node, so as to obtain the reception status indication information of the terminal.

It should be noted that the PDCP status report is used to indicate a reception status of the terminal side, for example, being used to indicate that a packet with PDCP SN=1 has been received and a packet with PDCP SN=2 has not been received. Based on the PDCP status report and the mapping relationship between GTP-U SNs and PDCP SNs that is obtained from the source node, the target node may determine that a data packet corresponding to a GTP-U SN has not received by the terminal, so as to retransmit data not yet received.

Correspondingly, step 102 includes:
   performing data transmission based on the source PDCP sequence number of the at least one first data packet and the mapping relationship.

The performing data transmission based on the source PDCP sequence number of the at least one first data packet and the mapping relationship includes:
   based on the mapping relationship, performing data retransmission from a first data packet with a smallest PDCP sequence number in the at least one first data packet.

For example, source PDCP sequence numbers of first data packets reported by the terminal are 3 and 4. The target node searches for a GTP-U sequence number of the data packet with the source PDCP sequence number=3 based on the mapping relationship, and performs data retransmission sequentially from a data packet corresponding to the GTP-U sequence number.

Optionally, in the foregoing embodiment of this application, step 101 includes:
   receiving status indication information sent by the source node, where the status indication information includes at least one of the following information:
   a GTP-U sequence number and a source PDCP sequence number that are of a latest data packet sent by the source node when the source node is handing over a terminal to the target node; where, for example, the latest data packet sent by the source node when the source node is handing over the terminal to the target node is a data packet corresponding to GTP-U SN=3, with a PDCP sequence number assigned by the source node being PDCP SN=5;
   a GTP-U sequence number and a source PDCP sequence number that are of the $1^{st}$ data packet to be sent by the source node when the source node determines to hand over the terminal to the target node; where, for example, the $1^{st}$ data packet to be sent by the source node when the source node determines to hand over the terminal to the target node is a data packet corresponding to GTP-U SN=3, with a PDCP sequence number assigned or to be assigned by the source node being PDCP SN=5; and
   a GTP-U sequence number and a source PDCP sequence number that are of a packet not received by the terminal before handover; where the source node can determine, based on the PDCP status report sent by the terminal, the GTP-U SN and PDCP SN of the data packet not received by the terminal before handover.

An occasion of initiating the status indication information by the source node may be when the source node determines to send a handover command to the terminal, or when the source node is sending a handover command to the terminal, or after the source node sends a handover command to the terminal, which is not specifically limited herein.

Optionally, in at least one embodiment of this application, before step 102, the method further includes:
   receiving data packets forwarded by the source node in an order of the GTP-U sequence numbers of the N data packets, where the forwarded data packets may be data buffered by the source node and/or new data obtained from a core-network node.

Optionally, when the source node is forwarding the data packets to the target node, a mapping relationship between GTP-U sequence numbers and source PDCP sequence numbers of the data packets can be also provided, where the source PDCP sequence number is a PDCP sequence number assigned to the data packet by the source node.

The receiving data packets forwarded by the source node in an order of the GTP-U sequence numbers of the N data packets includes:
   receiving data packets forwarded by the source node from a second data packet in an order of the GTP-U sequence numbers of the N data packets, where
   the second data packet is a data packet next to the latest data packet sent by the source node when the terminal is being handed over to the target node; or
   the second data packet is the $1^{st}$ data packet to be sent by the source node when the terminal is being handed over to the target node; or
   the second data packet is the $1^{st}$ data packet that has not been received by the terminal before handover.

For example, a next data packet waiting to send during handover of the terminal has GTP-U SN=6 (assuming that this packet corresponds to PDCP SN=6), the source node starts to forward data sequentially based on GTP-U SN=6/PDCP SN=6 to the target node. If the source node learns that a packet with GTP-U SN=2/PDCP SN=2 has not been received (assuming other data packets have been all received), the source node sequentially forwards the data packets with GTP-U SN=2/PDCP SN=2 and GTP-U SN=6/PDCP SN=6 to the target node.

Correspondingly, step 102 includes:

based on the mapping relationship, performing data retransmission sequentially from the data packet next to the latest data packet sent by the source node when the terminal is being handed over to the target node; or, based on the mapping relationship, performing data retransmission sequentially from the $1^{st}$ data packet to be sent by the source node when the terminal is being handed over to the target node.

Optionally, in at least one embodiment of this application, before step 101, the method further includes:

receiving a handover request message sent by the source node, where the handover request message carries at least one of a multicast service identifier and first indication information indicating that the source node requests to forward multicast service data.

The multicast service identifier may be a TMGI or a multicast service sequence number (for example, in an Xn interface establishment process, the source node obtains a list of multicast services that can be supported by the target node, and the source node may indicate a corresponding multicast service by using a multicast service sequence number in the list); for example, the first indication information is a DL forwarding IE (downlink forwarding IE), and if the IE is set to a first value, it indicates that the source node requests to forward corresponding multicast service data, or if the IE is set to a second value, it indicates that the source node does not request to forward corresponding multicast service data; for another example, the first indication information is a 1-bit indication, and if the 1-bit value is "1", it indicates that the source node requests to forward corresponding multicast service data, or if the 1-bit value is "0", it indicates that the source node does not request to forward corresponding multicast service data; for still another example, the first indication information is a specific indication, and if the specific indication is present, it indicates that the source node requests to forward corresponding multicast service data, or if the specific indication is absent, it indicates that the source node does not request to forward corresponding multicast service data; and sending a handover response message to the source node, where the handover response message carries at least one of the following information:

a multicast service identifier, where the multicast service identifier may be a TMGI;

second indication information indicating that the target node agrees to forward the multicast service data, where, for example, the second indication information is a specific IE, and if the specific IE is present, it indicates that the target node agrees to forward the multicast service data and the target node may perform data forwarding based on a GTP-U sequence number provided by the IE, or if the specific IE is absent, it indicates that the target node does not agree to forward the multicast service data;

first retransmission indication information indicating whether the target node is to perform data retransmission, where, for example, the first retransmission indication information is 1-bit indication information, and if a value of the 1-bit indication information is "1", it indicates that the target node performs data retransmission and the target node schedules the multicast service data using the C-RNTI of the terminal in this case, or if a value of the 1-bit indication information is "0", it indicates that the target node does not perform data retransmission;

second retransmission indication information indicating a resource for data retransmission to be performed by the target node, where, for example, a specific field corresponding to MRB is set to a first value, and when the terminal is handed over to the target node, the target node can schedule multicast service data using the C-RNTI of the terminal, or when the second retransmission indication information is temporary multicast data scheduling information (for example, a temporary G-RNTI) and when this indication exists, it indicates that the target node schedules multicast data using a temporary G-RNTI;

hybrid automatic repeat request (HARQ) process information for data retransmission, where, for example, when the terminal is handed over to the target node, the target node retransmits multicast data by using a specific HARQ process, for example, the target node is transmitting the multicast service in multicast mode by using a HARQ process ID=1, 2, and for the terminal, the target node assigns a specific HARQ process ID=3 to retransmit the multicast service data for the terminal; and configuration information of common resources for multicast data transmission in multicast mode, where the configuration information of the come resources may be scheduling information used for transmitting the multicast service in multicast mode by the target node, for example, scheduling information G-RNTI (this G-RNTI is different from the foregoing temporary G-RNTI) corresponding to a specific multicast service.

The source node determines, based on a multicast service requirement, whether to request to forward the multicast service data. For example, if a multicast service has a relatively high quality of service QoS requirement (for example, relatively high reliability), the source node adds, to the handover request, the first indication information for requesting to forward the multicast service data; otherwise, the first indication information is not carried.

In another optional embodiment of this application, before step 102, the method further includes:

establishing a connection to a terminal that has received a handover command message sent by the source node, where the handover command message carries at least one of the following information:

a multicast service identifier, where the multicast service identifier may be a TMGI;

first retransmission indication information indicating whether the target node is to perform data retransmission, where, for example, the first retransmission indication information is 1-bit indication information, and if a value of the 1-bit indication information is "1", it indicates that the target node performs data retransmission and the target node schedules the multicast service data using the C-RNTI of the terminal in this case, or if a value of the 1-bit indication information is "0", it indicates that the target node does not perform data retransmission;

second retransmission indication information indicating a resource for data retransmission to be performed by the target node, where, for example, a specific field corresponding to MRB is set to a first value, and when the terminal is handed over to the target node, the target node can schedule multicast service data using the C-RNTI of the terminal, or when the second retransmission indication information is temporary multicast data scheduling information (for example, a temporary G-RNTI) and when this indication exists, it indicates that the target node schedules multicast data using a temporary G-RNTI;

hybrid automatic repeat request HARQ process information for data retransmission, where, for example, when the terminal is handed over to the target node, the target node retransmits multicast data by using a specific HARQ process, for example, the target node is transmitting the multicast service in multicast mode by using a HARQ process ID=1, 2, and for the terminal, the target node assigns a specific HARQ process ID=3 to retransmit the multicast service data for the terminal; and configuration information of common resources for multicast data transmission in multicast mode, where the configuration information of the come resources may be scheduling information used for transmitting the multicast service in multicast mode by the target node, for example, scheduling information G-RNTI (this G-RNTI is different from the foregoing temporary G-RNTI) corresponding to a specific multicast service.

In this embodiment of this application, if the source node forwards the data packets in an order of the GTP-U sequence numbers of the N data packets, the method further includes:

based on a cached data status of the target node, sending a data-forwarding stop indication to the source node.

For example, the source node forwards data packets with GTP-U SN=3, 4, 5, . . . to the target node, and if the target node receives the data packet corresponding to GTP-U SN=5 and has the data packet corresponding to GTP-U SN=5 in its buffer, the target node indicates the source node to stop data forwarding; or if the target node receives the data packet corresponding to GTP-U SN=5 and has a data packet with GTP-U SN=6 in its buffer, the target node indicates the source node to stop data forwarding.

Optionally, after step 102, the method further includes:

sending third indication information to a terminal, where the third indication information is used to indicate that data retransmission by the target node has ended.

To sum up, in this embodiment of this application, in the process of handover of the terminal from one multicast cell to another multicast cell, the target node performs data retransmission based on the mapping relationship between GTP-U sequence numbers and source PDCP sequence numbers of data packets, so as to reduce data loss for the terminal during handover and further meet service requirements of multicast services, resolving the problem of data loss for the terminal during handover.

Figure 2:
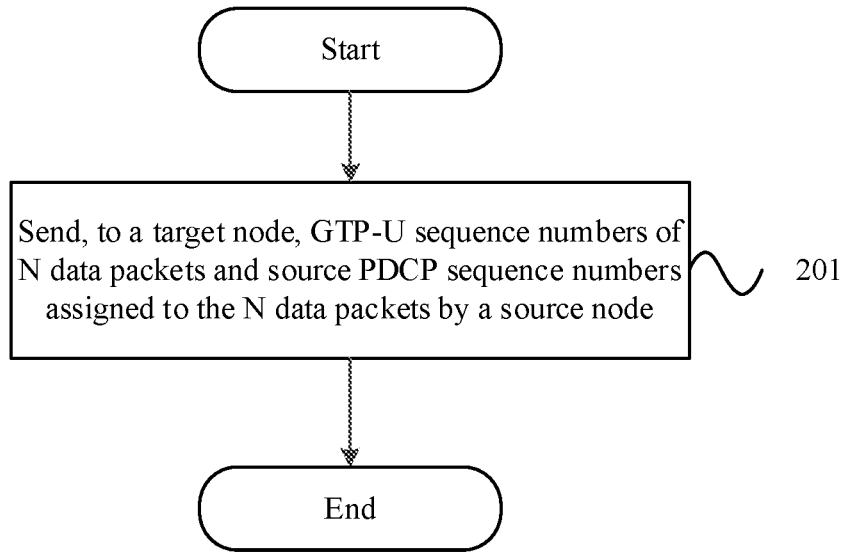
FIG. 2 is a second flowchart of steps of a data retransmission method according to an embodiment of this application.

As shown in FIG. 2, an embodiment of this application further provides a data retransmission method, applied to a source node and including:

Step 201: Send, to a target node, GTP-U sequence numbers of N data packets and source PDCP sequence numbers assigned to the N data packets by the source node, where N is an integer greater than or equal to 1.

The GTP-U sequence number means GPRS tunnelling protocol user plane sequence number (GTP-U sequence number, also referred to as GTP-U SN), and the PDCP sequence number means packet data convergence protocol sequence number (PDCP sequence number, also referred to as PDCP SN).

In this embodiment of this application, the source node and the target node are both network nodes that perform multicast transmission in multicast mode, and data loss is likely to occur during handover of the terminal from the source node to the target node. In this application, the target node performs data retransmission based on the mapping relationship between GTP-U sequence numbers and source PDCP sequence numbers, so as to reduce data loss for the terminal during handover and further meet service requirements of multicast services, resolving the problem of data loss for the terminal during handover.

It should be noted that, the data retransmission method provided in this embodiment of this application is executed by a data retransmission apparatus or a control module for loading the data retransmission method in the data retransmission apparatus. In this embodiment of this application, the data retransmission method provided by the embodiments of this application is described by using the data retransmission method being loaded by the data retransmission apparatus as an example.

Optionally, in the foregoing embodiment of this application, step 201 includes:

sending status indication information to the target node, where the status indication information includes at least one of the following information:

a GTP-U sequence number and a source PDCP sequence number that are of a latest data packet sent by the source node when the source node is handing over a terminal to the target node; where, for example, the latest data packet sent by the source node when the source node is handing over the terminal to the target node is a data packet corresponding to GTP-U SN=3, with a PDCP sequence number assigned by the source node being PDCP SN=5;

a GTP-U sequence number and a source PDCP sequence number that are of the 1$^{st}$ data packet to be sent by the source node when the source node determines to hand over the terminal to the target node; where, for example, the 1$^{st}$ data packet to be sent by the source node when the source node determines to hand over the terminal to the target node is a data packet corresponding to GTP-U SN=3, with a PDCP sequence number assigned or to be assigned by the source node being PDCP SN=5; and a GTP-U sequence number and a source PDCP sequence number that are of a packet not received by the terminal before handover; where the source node can determine, based on the PDCP status report sent by the terminal, the GTP-U SN and PDCP SN of the data packet not received by the terminal before handover.

An occasion of initiating the status indication information by the source node may be when the source node determines to send a handover command to the terminal, or when the source node is sending a handover command to the terminal, or after the source node sends a handover command to the terminal, which is not specifically limited herein.

Optionally, in at least one embodiment of this application, the method further includes:

forwarding data packets in an order of the GTP-U sequence numbers of the N data packets to the target node.

The forwarded data packets may be data buffered by the source node and/or new data obtained from a core-network node.

Optionally, when the source node is forwarding the data packets to the target node, a mapping relationship between GTP-U sequence numbers and source PDCP sequence numbers of the data packets can be also provided, where the source PDCP sequence number is a PDCP sequence number assigned to the data packet by the source node.

The forwarding data packets in an order of the GTP-U sequence numbers of the N data packets to the target node includes:

forwarding data packets from a second data packet in the sequence of the GTP-U sequence numbers to the target node, where the second data packet is a data packet next to the latest data packet sent by the source node when the terminal is being handed over to the target node; or the second data packet is the $1^{st}$ data packet to be sent by the source node when the terminal is being handed over to the target node; or the second data packet is the $1^{st}$ data packet that has not been received by the terminal before handover.

For example, a next data packet waiting to send during handover of the terminal has GTP-U SN=6 (assuming that this packet corresponds to PDCP SN=6), the source node starts to forward data sequentially based on GTP-U SN=6/PDCP SN=6 to the target node. If the source node learns that a packet with GTP-U SN=2/PDCP SN=2 has not been received (assuming other data packets have been all received), the source node sequentially forwards the data packets with GTP-U SN=2/PDCP SN=2 and GTP-U SN=6/PDCP SN=6 to the target node.

Optionally, in at least one embodiment of this application, before step 201, the method further includes:

sending a handover request message to the target node, where the handover request message carries at least one of a multicast service identifier and first indication information indicating that the source node requests to forward multicast service data, where the multicast service identifier may be a TMGI or a multicast service sequence number (for example, in an Xn interface establishment process, the source node obtains a list of multicast services that can be supported by the target node, and the source node may indicate a corresponding multicast service by using a multicast service sequence number in the list); for example, the first indication information is a DL forwarding IE (downlink forwarding IE), and if the IE is set to a first value, it indicates that the source node requests to forward corresponding multicast service data, or if the IE is set to a second value, it indicates that the source node does not request to forward corresponding multicast service data; for another example, the first indication information is a 1-bit indication, and if the 1-bit value is "1", it indicates that the source node requests to forward corresponding multicast service data, or if the 1-bit value is "0", it indicates that the source node does not request to forward corresponding multicast service data; for still another example, the first indication information is a specific indication, and if the specific indication is present, it indicates that the source node requests to forward corresponding multicast service data, or if the specific indication is absent, it indicates that the source node does not request to forward corresponding multicast service data; and receiving a handover response message sent by the target node, where the handover response message carries at least one of the following information:

a multicast service identifier, where the multicast service identifier may be a TMGI;

second indication information indicating that the target node agrees to forward the multicast service data, where, for example, the second indication information is a specific IE, and if the specific IE is present, it indicates that the target node agrees to forward the multicast service data and the target node may perform data forwarding based on a GTP-U sequence number provided by the IE, or if the specific IE is absent, it indicates that the target node does not agree to forward the multicast service data;

first retransmission indication information indicating whether the target node is to perform data retransmission, where, for example, the first retransmission indication information is 1-bit indication information, and if a value of the 1-bit indication information is "1", it indicates that the target node performs data retransmission and the target node schedules the multicast service data using the C-RNTI of the terminal in this case, or if a value of the 1-bit indication information is "0", it indicates that the target node does not perform data retransmission;

second retransmission indication information indicating a resource for data retransmission to be performed by the target node, where, for example, a specific field corresponding to MRB is set to a first value, and when the terminal is handed over to the target node, the target node can schedule multicast service data using the C-RNTI of the terminal, or when the second retransmission indication information is temporary multicast data scheduling information (for example, a temporary G-RNTI) and when this indication exists, it indicates that the target node schedules multicast data using a temporary G-RNTI;

hybrid automatic repeat request HARQ process information for data retransmission, where, for example, when the terminal is handed over to the target node, the target node retransmits multicast data by using a specific HARQ process, for example, the target node is transmitting the multicast service in multicast mode by using a HARQ process ID=1, 2, and for the terminal, the target node assigns a specific HARQ process ID=3 to retransmit the multicast service data for the terminal; and configuration information of common resources for multicast data transmission in multicast mode, where the configuration information of the come resources may be scheduling information used for transmitting the multicast service in multicast mode by the target node, for example, scheduling information G-RNTI (this G-RNTI is different from the foregoing temporary G-RNTI) corresponding to a specific multicast service.

The source node determines, based on a multicast service requirement, whether to request to forward the multicast service data. For example, if a multicast service has a relatively high quality of service QoS requirement (for example, relatively high reliability), the source node adds, to the handover request, the first indication information for requesting to forward the multicast service data; otherwise, the first indication information is not carried.

In still another optional embodiment, the method further includes:

sending a handover command message to the terminal, where the handover command message carries at least one of the following information:

a multicast service identifier, where the multicast service identifier may be a TMGI;

first retransmission indication information indicating whether the target node is to perform data retransmission, where, for example, the first retransmission indication information is 1-bit indication information, and if a value of the 1-bit indication information is "1", it indicates that the target node performs data retransmission and the target node schedules the multicast service data using the C-RNTI of the terminal in this case, or if a value of the 1-bit indication information is "0", it indicates that the target node does not perform data retransmission;

second retransmission indication information indicating a resource for data retransmission to be performed by the target node, where, for example, a specific field corresponding to MRB is set to a first value, and when the terminal is handed over to the target node, the target node can schedule multicast service data using the C-RNTI of the terminal, or when the second retransmission indication information is temporary multicast data scheduling information (for example, a temporary G-RNTI) and when this indication exists, it indicates that the target node schedules multicast data using a temporary G-RNTI;

hybrid automatic repeat request HARQ process information for data retransmission, where, for example, when the terminal is handed over to the target node, the target node retransmits multicast data by using a specific HARQ process, for example, the target node is transmitting the multicast service in multicast mode by using a HARQ process ID=1, 2, and for the terminal, the target node assigns a specific HARQ process ID=3 to retransmit the multicast service data for the terminal; and configuration information of common resources for multicast data transmission in multicast mode, where the configuration information of the come resources may be scheduling information used for transmitting the multicast service in multicast mode by the target node, for example, scheduling information G-RNTI (this G-RNTI is different from the foregoing temporary G-RNTI) corresponding to a specific multicast service.

In this embodiment of this application, if the source node forwards the data packets in an order of the GTP-U sequence numbers of the N data packets, the method further includes:

receiving a data-forwarding stop indication sent by the target node, and stopping data packet forwarding, where, for example, the source node forwards data packets with GTP-U SN=3, 4, 5, . . . to the target node, and if the target node receives the data packet corresponding to GTP-U SN=5 and has the data packet corresponding to GTP-U SN=5 in its buffer, the target node indicates the source node to stop data forwarding; or if the target node receives the data packet corresponding to GTP-U SN=5 and has a data packet with GTP-U SN=6 in its buffer, the target node indicates the source node to stop data forwarding.

Alternatively, the method further includes:

stopping data packet forwarding in a case that a first timer expires and the source node has received no data-forwarding stop indication sent by the target node, where the source node maintains a timer (the first timer), and when the timer expires, if no data-forwarding stop indication is received from the target node, the source node automatically stops data forwarding.

To sum up, in this embodiment of this application, in the process of handover of the terminal from one multicast cell to another multicast cell, the target node performs data retransmission based on the mapping relationship between GTP-U sequence numbers and source PDCP sequence numbers of data packets, so as to reduce data loss for the terminal during handover and further meet service requirements of multicast services, resolving the problem of data loss for the terminal during handover.

It should be noted that, the data retransmission method provided in this embodiment of this application is executed by a data retransmission apparatus or a control module for loading the data retransmission method in the data retransmission apparatus. In this embodiment of this application, the data retransmission method provided by the embodiments of this application is described by using the data retransmission method being loaded by the data retransmission apparatus as an example.

Figure 3:
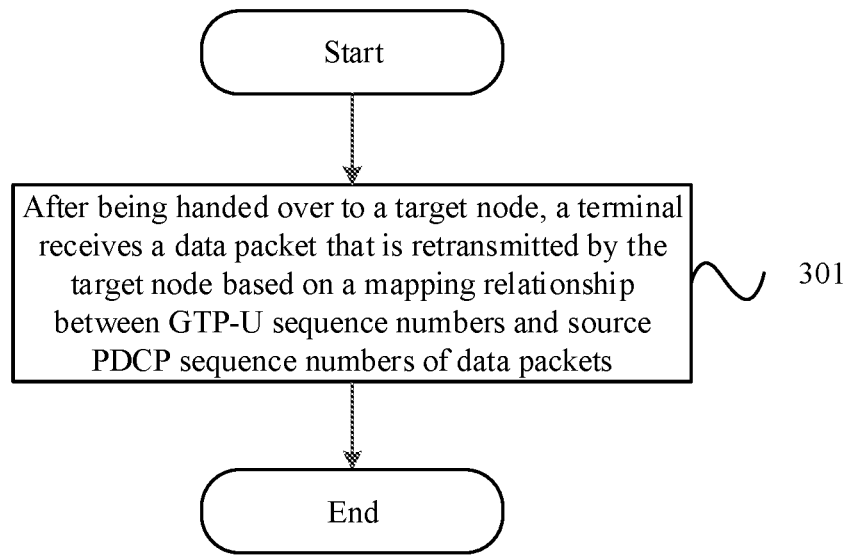
FIG. 3 is a third flowchart of steps of a data retransmission method according to an embodiment of this application.

As shown in FIG. 3, an embodiment of this application further provides a data retransmission method, applied to a terminal and including:

Step 301: After being handed over to a target node, the terminal receives a data packet that is retransmitted by the target node based on a mapping relationship between GTP-U sequence numbers and source PDCP sequence numbers of data packets.

The source PDCP sequence number of the data packet is a PDCP sequence number assigned to the data packet by a source node.

The GTP-U sequence number means GPRS tunnelling protocol user plane sequence number (GTP-U sequence number, also referred to as GTP-U SN), and the PDCP sequence number means packet data convergence protocol sequence number (PDCP sequence number, also referred to as PDCP SN).

The terminal maintains two sets of protocol stacks, respectively corresponding to a source MRB (a first protocol stack) and a target MRB (a second protocol stack). Data received by the terminal based on a data retransmission configuration corresponds to the protocol stack of the source MRB, and data received based on a common-resource configuration of a target cell corresponds to the protocol stack of the target MRB. (For example, when receiving data transmitted by using a C-RNTI, a temporary G-RNTI, or a G-RNTI by a specific HARQ process, the terminal submits the data to the protocol stack corresponding to the source MRB; and when receiving data transmitted by using a G-RNTI by a common HARQ process, the terminal submits the data to the protocol stack corresponding to the target MRB).

It should be noted that configuration information of common resources for multicast service data transmission in multicast mode in the target cell may be carried in a handover command, or may be obtained by reading system information of the target cell by the terminal after handover to the target cell, or may be sent to the terminal using dedicated signaling in the target cell.

Optionally, step 301 includes:

based on a first protocol stack of the source node, receiving the data packet retransmitted by the target node;

and/or, the method further includes:

based on a second protocol stack of the target node, receiving multicast service data sent by the target node.

It should be noted that the terminal can maintain two sets of protocol stacks, that is, the first protocol stack based on the source node and the second protocol stack based on the target node, and can simultaneously receive retransmission data sent by the target node and multicast service data sent by the target node in multicast mode. In order to ensure that the terminal delivers data to an upper layer (such as an application layer) in sequence, the terminal needs to first cache received data sent by the target node in multicast mode, and the data sent by the target node in multicast mode and cached is delivered to the upper layer only after the terminal receives a data retransmission end indication sent by the target node and delivers data of the first protocol stack to the upper layer. There may be duplicate data between data received based on the first protocol stack and data received based on the second protocol stack by the terminal, and the application layer of the terminal may perform duplication detection to discard or delete duplicate data.

It should be noted that the terminal can maintain two sets of protocol stacks, that is, the first protocol stack based on the source node and the second protocol stack based on the target node. After receiving a data retransmission end indication sent by the target node and delivering data of the first protocol stack to the upper layer, the terminal may start to receive, based on the second protocol stack, data sent by the target node in multicast mode.

In an optional embodiment of this application, step 301 includes:

receiving, by using a terminal-dedicated resource or a temporary scheduling resource, the data packet retransmitted by the target node.

The terminal-dedicated scheduling resource may be a wireless resource scheduled through terminal-dedicated scheduling (such as a C-RNTI of the terminal). The temporary scheduling resource may be a wireless resource scheduled through temporary scheduling (for example, a temporary G-RNTI assigned by the target node to the terminal, which is scheduling information different from that for transmitting a multicast service in multicast mode by the target node, such as G-RNTI).

The target node performs data transmission based on the mapping relationship between GTP-U sequence numbers and source PDCP sequence numbers that is obtained from the source node. For example, for a pair of GTP-U SN=5 and source PDCP SN=5 indicated by the source node, the source node assigns PDCP SN=5 to a data packet, and then the target node reuses the PDCP SN=5 to retransmit data with GTP-U SN=5. In another case, for a pair of GTP-U SN=6 and PDCP SN=None indicated by the source node, the source node has not assigned a PDCP SN to a data packet; in this case, the target node needs to perform numbering in sequence, for example, to obtain PDCP SN=6, and then the target node uses the PDCP SN=6 to retransmit data with GTP-U SN=6.

In an optional embodiment, before step 301, the method further includes:

receiving a handover command message sent by the source node; and establishing a connection to the target node based on the handover command message, where the handover command message carries at least one of the following information:

a multicast service identifier, where the multicast service identifier may be a TMGI;

first retransmission indication information indicating whether the target node is to perform data retransmission, where, for example, the first retransmission indication information is 1-bit indication information, and if a value of the 1-bit indication information is "1", it indicates that the target node performs data retransmission and the target node schedules the multicast service data using the C-RNTI of the terminal in this case, or if a value of the 1-bit indication information is "0", it indicates that the target node does not perform data retransmission;

second retransmission indication information indicating a resource for data retransmission to be performed by the target node, where, for example, a specific field corresponding to MRB is set to a first value, and when the terminal is handed over to the target node, the target node can schedule multicast service data using the C-RNTI of the terminal, or when the second retransmission indication information is temporary multicast data scheduling information (for example, a temporary G-RNTI) and when this indication exists, it indicates that the target node schedules multicast data using a temporary G-RNTI;

hybrid automatic repeat request HARQ process information for data retransmission, where, for example, when the terminal is handed over to the target node, the target node retransmits multicast data by using a specific HARQ process, for example, the target node is transmitting the multicast service in multicast mode by using a HARQ process ID=1, 2, and for the terminal, the target node assigns a specific HARQ process ID=3 to retransmit the multicast service data for the terminal; and configuration information of common resources for multicast data transmission in multicast mode, where the configuration information of the come resources may be scheduling information used for transmitting the multicast service in multicast mode by the target node, for example, scheduling information G-RNTI (this G-RNTI is different from the foregoing temporary G-RNTI) corresponding to a specific multicast service.

Further, after the terminal receives the handover command message, the method further includes at least one of the following:

keeping a receiving PDCP entity unchanged, where the receiving PDCP entity is corresponding to the source node for a multicast service indicated by the handover command message;

reestablishing a receiving radio link control RLC entity corresponding to multicast mode of the multicast service indicated by the handover command message, where the reestablishment behavior includes processing data cached in the receiving RLC entity and delivering the data to the upper layer (such as the PDCP entity, where such behavior is applicable to the RLC configured with a reordering function), and initializing a receive window of the receiving RLC entity; and triggering to feed back a status report, where the status report is used to indicate a reception status of the data packet on the terminal side, for example, the handover command instructs the network side (such as the target node) to retransmit a multicast service, and the terminal feeds back a downlink data reception status (for example, a PDCP status report) to the network side.

It should be noted that the receiving PDCP entity and the receiving RLC entity that are corresponding to the multicast mode of the multicast service are protocol stack entities used by the terminal for receiving a multicast service sent by the source node in multicast mode.

The receiving PDCP entity and the receiving RLC entity that are corresponding to the source node are protocol stack entities used when the terminal served by the source node receives data sent by the source node in multicast mode; and after handover, the terminal uses the protocol stack entities to receive retransmission data sent by the target node. After receiving the data retransmission end indication sent by the target node, the terminal may immediately deliver data of the protocol stack entities to the upper layer (which, for example, may be construed as releasing the PDCP entity and the RLC entity), or wait until the timers maintained by the protocol stack entities expire and then deliver data of the protocol stack entities to the upper layer.

The receiving PDCP entity and the receiving RLC entity that are corresponding to the target node are protocol stack entities used when the terminal served by the target node receives data sent by the target node in multicast mode.

In this embodiment of this application, after step 301, the method further includes:

receiving third indication information sent by the target node, where the third indication information is used to indicate that data retransmission by the target node has ended.

Correspondingly, if the network side configures a temporary G-RNTI for the terminal (that is, the target node uses a temporary scheduling resource to retransmit data to the terminal), the method further includes:

stopping monitoring a temporary scheduling resource, where the temporary scheduling resource is used for data retransmission by the target node.

It can be understood that if the network side configures a temporary scheduling resource (for example, a temporary G-RNTI) for the terminal, the terminal receiving the data retransmission end indication sent by the target node may be construed as the target node no longer using the temporary scheduling resource for data retransmission. In this case, the terminal may stop monitoring the temporary scheduling resource, or stop monitoring the temporary scheduling resource when the terminal determines or starts to deliver data of the first protocol stack to the upper layer.

Further, after the terminal receives the third indication information, the method further includes at least one of the following:

releasing a receiving PDCP entity corresponding to the source node for a multicast service indicated by the handover command message, where the releasing behavior includes processing data cached in the receiving PDCP entity and delivering the data to the upper layer, and then releasing the receiving PDCP entity;

releasing a receiving RLC entity corresponding to the source node for a multicast service indicated by the handover command message, where the releasing behavior includes processing data cached in the receiving RLC entity and delivering the data to the upper layer (such as the PDCP entity, where such behavior is applicable to the RLC configured with a reordering function), and then releasing the receiving RLC entity;

indicating that a receiving PDCP entity corresponding to the target node for the multicast service indicated by the handover command message is able to submit data to an upper layer in sequence; and indicating that a receiving RLC entity corresponding to the target node for the multicast service indicated by the handover command message is able to submit data to an upper layer in sequence.

In an optional embodiment, before step 301, the method further includes:

sending, to the target node, reception status indication information of the terminal for a data packet sent by the source node, where the reception status indication information is used to indicate a source PDCP sequence number of at least one first data packet, and the first data packet is a data packet that has not been received by the terminal before node switching.

For example, the terminal actively sends a PDCP status report to the target node in a timely manner when or after establishing a connection to the target node, so that the target node can learn the reception status indication information of the terminal; or, the target node requests the terminal to or the source node instructs the terminal to send a PDCP status report to the target node, so as to obtain the reception status indication information of the terminal.

It should be noted that the PDCP status report is used to indicate a reception status of the terminal side, for example, being used to indicate that a packet with PDCP SN=1 has been received and a packet with PDCP SN=2 has not been received. Based on the PDCP status report and the mapping relationship between GTP-U SNs and PDCP SNs that is obtained from the source node, the target node may determine that a data packet corresponding to a GTP-U SN has not received by the terminal, so as to retransmit data not yet received.

Correspondingly, step 301 includes:

receiving data packets that are retransmitted based on the mapping relationship from a first data packet with a smallest PDCP sequence number in the at least one first data packet.

For example, source PDCP sequence numbers of first data packets reported by the terminal are 3 and 4. The target node searches for a GTP-U sequence number of the data packet with the source PDCP sequence number=3 based on the mapping relationship, and performs data retransmission sequentially from a data packet corresponding to the GTP-U sequence number.

To sum up, in this embodiment of this application, in the process of handover of the terminal from one multicast cell to another multicast cell, the target node performs data retransmission based on the mapping relationship between GTP-U sequence numbers and source PDCP sequence numbers of data packets, so as to reduce data loss for the terminal during handover and further meet service requirements of multicast services, resolving the problem of data loss for the terminal during handover.

It should be noted that, the data retransmission method provided in this embodiment of this application is executed by a data retransmission apparatus or a control module for loading the data retransmission method in the data retransmission apparatus. In this embodiment of this application, the data retransmission method provided by the embodiments of this application is described by using the data retransmission method being loaded by the data retransmission apparatus as an example.

Figure 4:
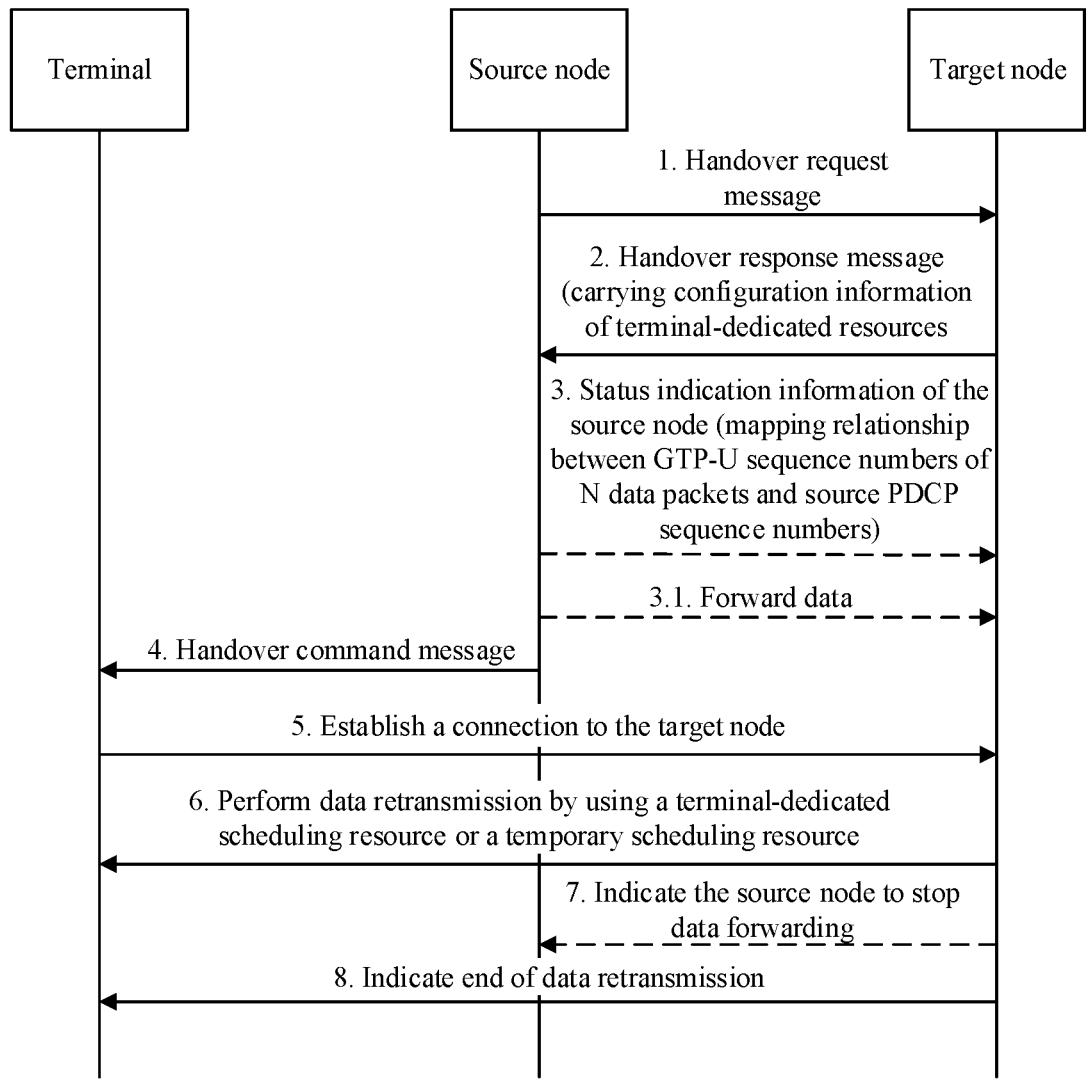
FIG. 4 is a schematic interaction diagram of a data retransmission method according to an embodiment of this application.

In order to describe the data retransmission method provided in this application more clearly, the data retransmission method is described below with reference to an example. As shown in FIG. 4, the data retransmission method includes the following steps.

Step 1: The source node sends a handover request message to the target node, where the handover request message carries multicast related information and the multicast service information includes one or more of the following contents:

a multicast service identifier, where the multicast service identifier may be a TMGI or a multicast service sequence number (for example, in an Xn interface establishment process, the source node obtains a list of multicast services that can be supported by the target node, and the source node may indicate a corresponding multicast service by using a multicast service sequence number in the list); and first indication information indicating that the source node requests to forward multicast service data, where, for example, the first indication information is a DL forwarding IE (downlink forwarding IE), and if the IE is set to a first value, it indicates that the source node requests to forward corresponding multicast service data, or if the IE is set to a second value, it indicates that the source node does not request to forward corresponding multicast service data; for another example, the first indication information is a 1-bit indication, and if the 1-bit value is "1", it indicates that the source node requests to forward corresponding multicast service data, or if the 1-bit value is "0", it indicates that the source node does not request to forward corresponding multicast service data; for still another example, the first indication information is a specific indication, and if the specific indication is present, it indicates that the source node requests to forward corresponding multicast service data, or if the specific indication is absent, it indicates that the source node does not request to forward corresponding multicast service data.

Step 2: The target node sends a handover response message to the source node, where the handover response message carries multicast service related information, and the multicast service related information includes one or more of the following:

a multicast service identifier, where the multicast service identifier may be a TMGI;

second indication information indicating that the target node agrees to forward the multicast service data, where, for example, the second indication information is a specific IE, and if the specific IE is present, it indicates that the target node agrees to forward the multicast service data and the target node may perform data forwarding based on a GTP-U sequence number provided by the IE, or if the specific IE is absent, it indicates that the target node does not agree to forward the multicast service data;

first retransmission indication information indicating whether the target node is to perform data retransmission, where, for example, the first retransmission indication information is 1-bit indication information, and if a value of the 1-bit indication information is "1", it indicates that the target node performs data retransmission and the target node schedules the multicast service data using the C-RNTI of the terminal in this case, or if a value of the 1-bit indication information is "0", it indicates that the target node does not perform data retransmission;

second retransmission indication information indicating a resource for data retransmission to be performed by the target node, where, for example, a specific field corresponding to MRB is set to a first value, and when the terminal is handed over to the target node, the target node can schedule multicast service data using the C-RNTI of the terminal, or when the second retransmission indication information is temporary multicast data scheduling information (for example, a temporary G-RNTI) and when this indication exists, it indicates that the target node schedules multicast data using a temporary G-RNTI;

hybrid automatic repeat request HARQ process information for data retransmission, where, for example, when the terminal is handed over to the target node, the target node retransmits multicast data by using a specific HARQ process, for example, the target node is transmitting the multicast service in multicast mode by using a HARQ process ID=1, 2, and for the terminal, the target node assigns a specific HARQ process ID=3 to retransmit the multicast service data for the terminal; and configuration information of common resources for multicast data transmission in multicast mode, where the configuration information of the come resources may be scheduling information used for transmitting the multicast service in multicast mode by the target node, for example, scheduling information G-RNTI (this G-RNTI is different from the foregoing temporary G-RNTI) corresponding to a specific multicast service.

Step 3: The source node sends status indication information to the target node, where the status indication information is used to indicate a mapping relationship between GTP-U sequence numbers of N data packets and source PDCP sequence numbers, and the status indication information includes at least one of the following information:

a GTP-U sequence number and a source PDCP sequence number that are of a latest data packet sent by the source node when the source node is handing over a terminal to the target node; where, for example, the latest data packet sent by the source node when the source node is handing over the terminal to the target node is a data packet corresponding to GTP-U SN=3, with a PDCP sequence number assigned by the source node being PDCP SN=5;

a GTP-U sequence number and a source PDCP sequence number that are of the $1^{st}$ data packet to be sent by the source node when the source node determines to hand over the terminal to the target node; where, for example, the $1^{st}$ data packet to be sent by the source node when the source node determines to hand over the terminal to the target node is a data packet corresponding to GTP-U SN=3, with a PDCP sequence number assigned or to be assigned by the source node being PDCP SN=5; and a GTP-U sequence number and a source PDCP sequence number that are of a packet not received by the terminal before handover; where the source node can determine, based on the PDCP status report sent by the terminal, the GTP-U SN and PDCP SN of the data packet not received by the terminal before handover.

An occasion of initiating the status indication information by the source node may be when the source node determines to send a handover command to the terminal, or when the source node is sending a handover command to the terminal, or after the source node sends a handover command to the terminal, which is not specifically limited herein.

Step 3.1: The source node forwards data to the target node. For example, the source node forwards data to the target node sequentially (GTP-U SN), and the data may be data cached in the source node and/or new data obtained from a core-network node.

The source node provides the mapping relationship between GTP-U SNs of data packets and source PDCP SNs when forwarding the data to the target node, where the source PDCP SN is a PDCP sequence number assigned to the data packet by the source node.

The source node starts to sequentially send data packets corresponding to the status indication information of the source node during handover of the terminal; or the source node starts to sequentially send data packets from a next data packet corresponding to the status indication information of the source node during handover of the terminal.

In addition, if the source node obtains the receiving status information of the terminal, the source node sequentially forwards data starting from the $1^{st}$ piece of data that the terminal has not received. For example, a next data packet waiting to send during handover of the terminal has GTP-U SN=6 (assuming that this packet corresponds to PDCP SN=6), the source node starts to forward data sequentially based on GTP-U SN=6/PDCP SN=6 to the target node. If the source node learns that a packet with GTP-U SN=2/PDCP SN=2 has not been received (assuming other data packets have been all received), the source node sequentially forwards the data packets with GTP-U SN=2/PDCP SN=2 and GTP-U SN=6/PDCP SN=6 to the target node.

Step 3 and step 3.1 may be independent processes or a combined process.

Step 4: The source node sends a handover command message to the terminal, where the handover command message carries multicast service related information, and the multicast service related information includes at least one of the following content:

- a multicast service identifier, where the multicast service identifier may be a TMGI;
- first retransmission indication information indicating whether the target node is to perform data retransmission, where, for example, the first retransmission indication information is 1-bit indication information, and if a value of the 1-bit indication information is "1", it indicates that the target node performs data retransmission and the target node schedules the multicast service data using the C-RNTI of the terminal in this case, or if a value of the 1-bit indication information is "0", it indicates that the target node does not perform data retransmission;
- second retransmission indication information indicating a resource for data retransmission to be performed by the target node, where, for example, a specific field corresponding to MRB is set to a first value, and when the terminal is handed over to the target node, the target node can schedule multicast service data using the C-RNTI of the terminal, or when the second retransmission indication information is temporary multicast data scheduling information (for example, a temporary G-RNTI) and when this indication exists, it indicates that the target node schedules multicast data using a temporary G-RNTI;
- hybrid automatic repeat request HARQ process information for data retransmission, where, for example, when the terminal is handed over to the target node, the target node retransmits multicast data by using a specific HARQ process, for example, the target node is transmitting the multicast service in multicast mode by using a HARQ process ID=1, 2, and for the terminal, the target node assigns a specific HARQ process ID=3 to retransmit the multicast service data for the terminal; and
- configuration information of common resources for multicast data transmission in multicast mode, where the configuration information of the come resources may be scheduling information used for transmitting the multicast service in multicast mode by the target node, for example, scheduling information G-RNTI corresponding to a specific multicast service.

Step 5: The terminal receives the handover command message sent by the source node, where the handover command message carries multicast service related information. The terminal initiates a connection establishment procedure to the target node. In addition, the behavior of the terminal includes one or more of the following:

- keeping a receiving PDCP entity unchanged, where the receiving PDCP entity is corresponding to the source node for a multicast service indicated by the handover command message;
- reestablishing a receiving radio link control RLC entity corresponding to multicast mode of the multicast service indicated by the handover command message; and
- triggering to feed back a status report, where the status report is used to indicate a reception status of the data packet on the terminal side.

Step 6: The target node performs data retransmission, where a resource for data retransmission is a wireless resource obtained through terminal-dedicated scheduling (for example, C-RNTI) or temporary scheduling (for example, temporary G-RNTI) by the terminal. The target node performs data retransmission based on the mapping relationship between GTP-U SNs and source PDCP SNs that is obtained from the source node. For example, for a pair of GTP-U SN=5 and source PDCP SN=5 indicated by the source node, the source node assigns PDCP SN=5 to a data packet, and then the target node reuses the PDCP SN=5 to retransmit data with GTP-U SN=5. In another case, for a pair of GTP-U SN=6 and PDCP SN=None indicated by the source node, the source node has not assigned a PDCP SN to a data packet; in this case, the target node needs to perform numbering in sequence, for example, to obtain PDCP SN=6, and then the target node uses the PDCP SN=6 to retransmit data with GTP-U SN=6.

It should be noted that the terminal maintains two sets of protocol stacks, respectively corresponding to a source MRB (a first protocol stack) and a target MRB (a second protocol stack). Data received by the terminal based on a data retransmission configuration corresponds to the protocol stack of the source MRB, and data received based on a common-resource configuration of a target cell corresponds to the protocol stack of the target MRB. (For example, when receiving data transmitted by using a C-RNTI, a temporary G-RNTI, or a G-RNTI by a specific HARQ process, the terminal submits the data to the protocol stack corresponding to the source MRB; and when receiving data transmitted by using a G-RNTI by a common HARQ process, the terminal submits the data to the protocol stack corresponding to the target MRB).

Step 7: The target node indicates the source node to stop data forwarding. For example, the target node determines, based on the following information, an occasion of indicating the source node to stop data forwarding:

- based on a cached data status or a sending status of the target node, where, for example, the source node forwards data packets with GTP-U SN=3, 4, 5, . . . to the target node, and if the target node receives the data packet corresponding to GTP-U SN=5 and has the data packet corresponding to GTP-U SN=5 in its buffer, the target node indicates the source node to stop data forwarding; or if the target node receives the data packet corresponding to GTP-U SN=5 and has a data packet with GTP-U SN=6 in its buffer, the target node indicates the source node to stop data forwarding. For example, the source node forwards data packets with GTP-U SN=3, 4, 5, . . . to the target node, and if the target node receives the data packet corresponding to GTP-U SN=5 and the target node is sending the data packet corresponding to GTP-U SN=5, the target node indicates the source node to stop data forwarding; or if the target node receives the data packet corresponding to GTP-U SN=5 and the $1^{st}$ data packet to be sent by the target node is a data packet corresponding to GTP-U SN=6, the target node indicates the source node to stop data forwarding.

Optionally, step 7 may be performed before or after step 8.

Alternatively, the source node maintains a timer. When the timer expires, if no data-forwarding stop indication information is received from the target node, the source node automatically stops data forwarding.

Step 8: The target node sends, to the terminal, third indication information indicating that data retransmission by the target node has ended. After the terminal receives the third indication information, the behavior of the terminal further includes one or more of the following:

releasing a receiving PDCP entity corresponding to the source node for a multicast service indicated by the handover command message;

releasing a receiving RLC entity corresponding to the source node for the multicast service indicated by the handover command message;

indicating that a receiving PDCP entity corresponding to the target node for the multicast service indicated by the handover command message is able to submit data to an upper layer in sequence; and indicating that a receiving RLC entity corresponding to the target node for the multicast service indicated by the handover command message is able to submit data to an upper layer in sequence.

It should be noted that the receiving PDCP entity and the receiving RLC entity that are corresponding to the source node are protocol stack entities used when the terminal served by the source node receives data sent by the source node in multicast mode; and after handover, the terminal uses the protocol stack entities to receive retransmission data sent by the target node. After receiving the data retransmission end indication sent by the target node, the terminal may immediately deliver data of the protocol stack entities to the upper layer (which, for example, may be construed as releasing the PDCP entity and the RLC entity), or wait until the timers maintained by the protocol stack entities expire and then deliver data of the protocol stack entities to the upper layer.

It should be noted that the receiving PDCP entity and the receiving RLC entity that are corresponding to the target node are protocol stack entities used when the terminal served by the target node receives data sent by the target node in multicast mode.

In addition, if the network side configures a temporary G-RNTI for the terminal, the terminal stops monitoring the temporary G-RNTI.

It can be understood that if the network side configures a temporary scheduling resource (for example, a temporary G-RNTI) for the terminal, the terminal receiving the data retransmission end indication sent by the target node may be construed as the target node no longer using the temporary scheduling resource for data retransmission. In this case, the terminal may stop monitoring the temporary scheduling resource, or stop monitoring the temporary scheduling resource when the terminal determines or starts to deliver data of the first protocol stack to the upper layer.

Figure 5:
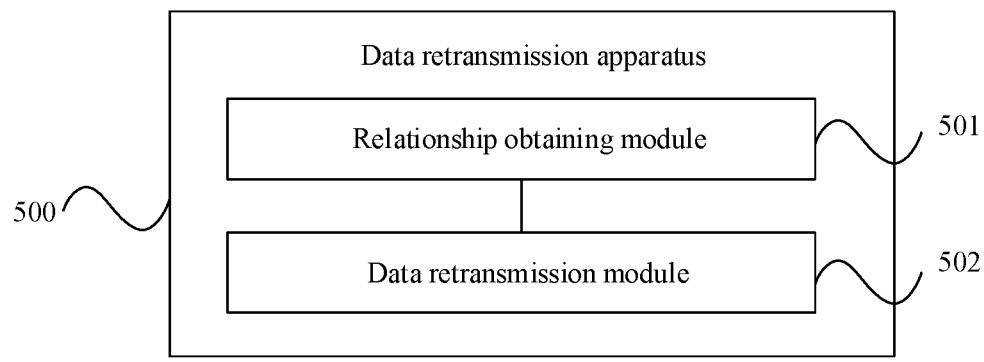
FIG. 5 is a first schematic structural diagram of a data retransmission apparatus according to an embodiment of this application.

As shown in FIG. 5, an embodiment of this application further provides a data retransmission apparatus 500, applied to a target node and including:

a relationship obtaining module 501, configured to obtain a mapping relationship between GTP-U sequence numbers of N data packets sent by a source node and source PDCP sequence numbers assigned to the N data packets by the source node, where N is an integer greater than or equal to 1; and a data retransmission module 502, configured to perform data retransmission based on the mapping relationship.

In at least one optional embodiment of this application, the apparatus includes:

an information obtaining module, configured to obtain reception status indication information of a terminal for a data packet sent by the source node, where the reception status indication information is used to indicate a source PDCP sequence number of at least one first data packet, and the first data packet is a data packet that has not been received by the terminal before node switching; where the data retransmission module includes:

a first data retransmission submodule, configured to perform data transmission based on the source PDCP sequence number of the at least one first data packet and the mapping relationship.

In at least one optional embodiment of this application, the first data retransmission submodule includes:

a first data retransmission unit, configured to: based on the mapping relationship, perform data retransmission from a first data packet with a smallest PDCP sequence number in the at least one first data packet.

In at least one optional embodiment of this application, the relationship obtaining module includes:

a relationship obtaining submodule, configured to receive status indication information sent by the source node, where the status indication information includes at least one of the following information:

a GTP-U sequence number and a source PDCP sequence number that are of a latest data packet sent by the source node when the source node is handing over the terminal to the target node;

a GTP-U sequence number and a source PDCP sequence number that are of the 1$^{st}$ data packet to be sent by the source node when the source node determines to hand over the terminal to the target node; and a GTP-U sequence number and a source PDCP sequence number that are of a packet not received by the terminal before handover.

In at least one optional embodiment of this application, the apparatus includes:

a. a data receiving module, configured to receive data packets forwarded by the source node in an order of the GTP-U sequence numbers of the N data packets.

In at least one optional embodiment of this application, the data receiving module includes:

a data receiving submodule, configured to receive data packets forwarded by the source node from a second data packet in an order of the GTP-U sequence numbers of the N data packets, where the second data packet is a data packet next to the latest data packet sent by the source node when the terminal is being handed over to the target node; or the second data packet is the 1$^{st}$ data packet to be sent by the source node when the terminal is being handed over to the target node; or the second data packet is the 1$^{st}$ data packet that has not been received by the terminal before handover.

In at least one optional embodiment of this application, the data retransmission module includes:

a second data retransmission submodule, configured to: based on the mapping relationship, perform data retransmission sequentially from the data packet next to the latest data packet sent by the source node when the terminal is being handed over to the target node; or based on the mapping relationship, perform data retransmission sequentially from the 1$^{st}$ data packet to be sent by the source node when the terminal is being handed over to the target node.

In at least one optional embodiment of this application, the apparatus includes:
  a request receiving module, configured to receive a handover request message sent by the source node, where the handover request message carries at least one of a multicast service identifier and first indication information indicating that the source node requests to forward multicast service data; and
  a response sending module, configured to send a handover response message to the source node, where the handover response message carries at least one of the following information:
  a multicast service identifier;
  second indication information indicating that the target node agrees to forward the multicast service data;
  first retransmission indication information indicating whether the target node is to perform data retransmission;
  second retransmission indication information indicating a resource for data retransmission to be performed by the target node;
  hybrid automatic repeat request HARQ process information for data retransmission; and
  configuration information of common resources for multicast data transmission in multicast mode.

In at least one optional embodiment of this application, the apparatus includes:
  a second connecting module, configured to establish a connection to a terminal that has received a handover command message sent by the source node, where the handover command message carries at least one of the following information:
  a multicast service identifier;
  first retransmission indication information indicating whether the target node is to perform data retransmission;
  second retransmission indication information indicating a resource for data retransmission to be performed by the target node;
  hybrid automatic repeat request HARQ process information for data retransmission; and
  configuration information of common resources for multicast data transmission in multicast mode.

In at least one optional embodiment of this application, the apparatus includes:
  an indication sending module is configured to: based on a cached data status of the target node, send a data-forwarding stop indication to the source node.

In at least one optional embodiment of this application, the apparatus includes:
  a third sending module, configured to send third indication information to a terminal, where the third indication information is used to indicate that data retransmission by the target node has ended.

The data retransmission apparatus provided in this embodiment of this application is capable of implementing the processes implemented by the data retransmission apparatus in the method embodiment in FIG. 1. To avoid repetition, details are not described herein again.

In this embodiment of this application, in the process of handover of the terminal from one multicast cell to another multicast cell, the target node performs data retransmission based on the mapping relationship between GTP-U sequence numbers and source PDCP sequence numbers of data packets, so as to reduce data loss for the terminal during handover and further meet service requirements of multicast services, resolving the problem of data loss for the terminal during handover.

Optionally, an embodiment of this application further provides a communications device. The communications device is a target node, including a processor, a memory, and a program or an instruction stored in the memory and capable of running on the processor. When the program or the instruction is executed by the processor, the processes of the foregoing embodiment of the data retransmission method are implemented, with the same technical effects achieved. To avoid repetition, details are not described herein again.

Figure 6:
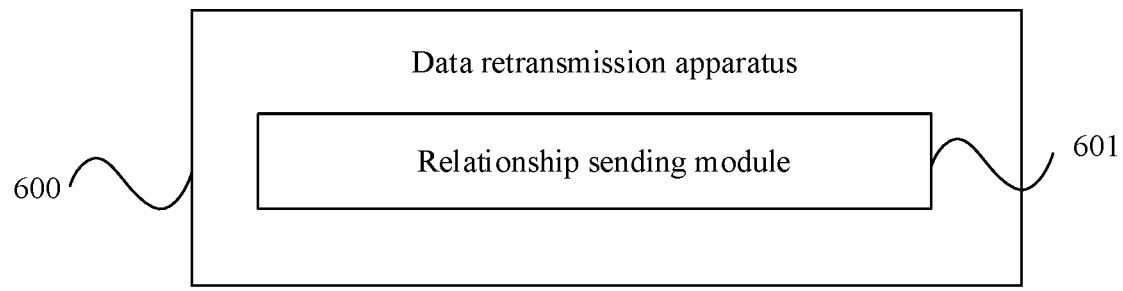
FIG. 6 is a second schematic structural diagram of a data retransmission apparatus according to an embodiment of this application.

As shown in FIG. 6, an embodiment of this application further provides a data retransmission apparatus 600, applied to a source node and including:
  a relationship sending module 601, configured to send, to a target node, GTP-U sequence numbers of N data packets and source PDCP sequence numbers assigned to the N data packets by the source node, where N is an integer greater than or equal to 1.

In at least one optional embodiment of this application, the relationship sending module includes:
  a relationship sending submodule, configured to send status indication information to the target node, where the status indication information includes at least one of the following information:
  a GTP-U sequence number and a source PDCP sequence number that are of a latest data packet sent by the source node when the source node is handing over a terminal to the target node;
  a GTP-U sequence number and a source PDCP sequence number that are of the $1^{st}$ data packet to be sent by the source node when the source node determines to hand over the terminal to the target node; and
  a GTP-U sequence number and a source PDCP sequence number that are of a packet not received by the terminal before handover.

In at least one optional embodiment of this application, the apparatus includes:
  a data forwarding module, configured to forward data packets in an order of the GTP-U sequence numbers of the N data packets to the target node.

In at least one optional embodiment of this application, the data forwarding module includes:
  a data forwarding submodule, configured to forward data packets from a second data packet in the sequence of the GTP-U sequence numbers to the target node; where
  the second data packet is a data packet next to the latest data packet sent by the source node when the terminal is being handed over to the target node; or
  the second data packet is the $1^{st}$ data packet to be sent by the source node when the terminal is being handed over to the target node; or
  the second data packet is the $1^{st}$ data packet that has not been received by the terminal before handover.

In at least one optional embodiment of this application, the apparatus includes:
  a request sending module, configured to send a handover request message to the target node, where the handover request message carries at least one of a multicast service identifier and first indication information indicating that the source node requests to forward multicast service data; and
  a response receiving module, configured to receive a handover response message sent by the target node, where the handover response message carries at least one of the following information:
a multicast service identifier;
second indication information indicating that the target node agrees to forward the multicast service data;
first retransmission indication information indicating whether the target node is to perform data retransmission;
second retransmission indication information indicating a resource for data retransmission to be performed by the target node;
hybrid automatic repeat request HARQ process information for data retransmission; and
configuration information of common resources for multicast data transmission in multicast mode.

In at least one optional embodiment of this application, the apparatus includes:
a command sending module, configured to send a handover command message to a terminal, where the handover command message carries at least one of the following information:
a multicast service identifier;
first retransmission indication information indicating whether the target node is to perform data retransmission;
second retransmission indication information indicating a resource for data retransmission to be performed by the target node;
hybrid automatic repeat request HARQ process information for data retransmission; and
configuration information of common resources for multicast data transmission in multicast mode.

In at least one optional embodiment of this application, the apparatus includes:
a stopping module, configured to receive a data-forwarding stop indication sent by the target node, and stopping data packet forwarding;
stop data packet forwarding in a case that a first timer expires and the source node has received no data-forwarding stop indication sent by the target node.

The data retransmission apparatus provided in this embodiment of this application is capable of implementing the processes implemented by the data retransmission apparatus in the method embodiment in FIG. 2. To avoid repetition, details are not described herein again.

In this embodiment of this application, in the process of handover of the terminal from one multicast cell to another multicast cell, the target node performs data retransmission based on the mapping relationship between GTP-U sequence numbers and source PDCP sequence numbers of data packets, so as to reduce data loss for the terminal during handover and further meet service requirements of multicast services, resolving the problem of data loss for the terminal during handover.

Optionally, an embodiment of this application further provides a communications device. The communications device is a source node, including a processor, a memory, and a program or an instruction stored in the memory and capable of running on the processor. When the program or the instruction is executed by the processor, the processes of the foregoing embodiment of the data retransmission method are implemented, with the same technical effects achieved. To avoid repetition, details are not described herein again.

Figure 7:
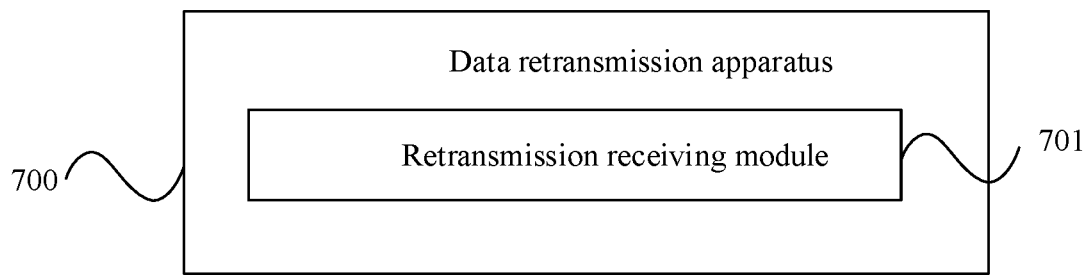
FIG. 7 is a third schematic structural diagram of a data retransmission apparatus according to an embodiment of this application.

As shown in FIG. 7, an embodiment of this application further provides a data retransmission apparatus 700, applied to a terminal and including:

a retransmission receiving module 701, configured to: after the terminal is handed over to a target node, receive a data packet that is retransmitted by the target node based on a mapping relationship between GTP-U sequence numbers and source PDCP sequence numbers of data packets; where
the source PDCP sequence number of the data packet is a PDCP sequence number assigned to the data packet by a source node.

In at least one optional embodiment of this application, the retransmission receiving module includes:
a first submodule, configured to: based on a first protocol stack of the source node, receive the data packet retransmitted by the target node.

In at least one optional embodiment of this application, the retransmission receiving module includes:
a retransmission receiving submodule, configured to receive, by using a terminal-dedicated resource or a temporary scheduling resource, the data packet retransmitted by the target node.

In at least one optional embodiment of this application, the apparatus includes:
a command receiving module, configured to receive a handover command message sent by the source node; and
a first connecting module, configured to establish a connection to the target node based on the handover command message, where the handover command message carries at least one of the following information:
a multicast service identifier;
first retransmission indication information indicating whether the target node is to perform data retransmission;
second retransmission indication information indicating a resource for data retransmission to be performed by the target node;
hybrid automatic repeat request HARQ process information for data retransmission; and
configuration information of common resources for multicast data transmission in multicast mode.

In at least one optional embodiment of this application, the apparatus further includes at least one of the following modules:
a first retaining module, configured to keep a receiving PDCP entity unchanged, where the receiving PDCP entity is corresponding to the source node for a multicast service indicated by the handover command message;
a first reestablishing module, configured to reestablish a receiving radio link control RLC entity corresponding to multicast mode of the multicast service indicated by the handover command message; and
a first feedback module, configured to trigger to feed back a status report, where the status report is used to indicate a reception status of the data packet on the terminal side.

In at least one optional embodiment of this application, the apparatus includes:
a stop indication receiving module, configured to receive third indication information sent by the target node, where the third indication information is used to indicate that data retransmission by the target node has ended.

In at least one optional embodiment of this application, the apparatus includes:

a fourth receiving module, configured to: based on a second protocol stack of the target node, receive multicast service data sent by the target node.

In at least one optional embodiment of this application, the apparatus further includes at least one of the following modules:

a first releasing module, configured to release a receiving PDCP entity corresponding to the source node for a multicast service indicated by the handover command message;

a second releasing module, configured to release a receiving RLC entity corresponding to the source node for the multicast service indicated by the handover command message;

a first indication module, configured to indicate that a receiving PDCP entity corresponding to the target node for the multicast service indicated by the handover command message is able to submit data to an upper layer in sequence; and a second indication module, configured to indicate that a receiving RLC entity corresponding to the target node for the multicast service indicated by the handover command message is able to submit data to an upper layer in sequence.

The data retransmission apparatus provided in this embodiment of this application is capable of implementing the processes implemented by the data retransmission apparatus in the method embodiment in FIG. 3. To avoid repetition, details are not described herein again.

In this embodiment of this application, in the process of handover of the terminal from one multicast cell to another multicast cell, the target node performs data retransmission based on the mapping relationship between GTP-U sequence numbers and source PDCP sequence numbers of data packets, so as to reduce data loss for the terminal during handover and further meet service requirements of multicast services, resolving the problem of data loss for the terminal during handover.

Optionally, an embodiment of this application further provides a communications device. The communications device is a terminal, including a processor, a memory, and a program or an instruction stored in the memory and capable of running on the processor. When the program or the instruction is executed by the processor, the processes of the foregoing embodiment of the data retransmission method are implemented, with the same technical effects achieved. To avoid repetition, details are not described herein again.

The data retransmission apparatus in this embodiment of this application may be an apparatus, or may be a component, an integrated circuit, or a chip in the terminal. The apparatus may be a mobile electronic device or a non-mobile electronic device. For example, the mobile electronic device may be a mobile phone, a tablet computer, a notebook computer, a palmtop computer, an in-vehicle electronic device, a wearable device, an ultra-mobile personal computer (UMPC), a netbook, a personal digital assistant (PDA), or the like. The non-mobile electronic device may be a server, a network-attached storage (NAS), a personal computer (PC), a television (TV), a teller machine, a self-service machine, or the like. This is not specifically limited in the embodiments of this application.

The data retransmission apparatus in this embodiment of this application may be an apparatus having an operating system. The operating system may be the Android operating system, the iOS operating system, or other possible operating systems, which is not specifically limited in the embodiments of this application.

Figure 8:
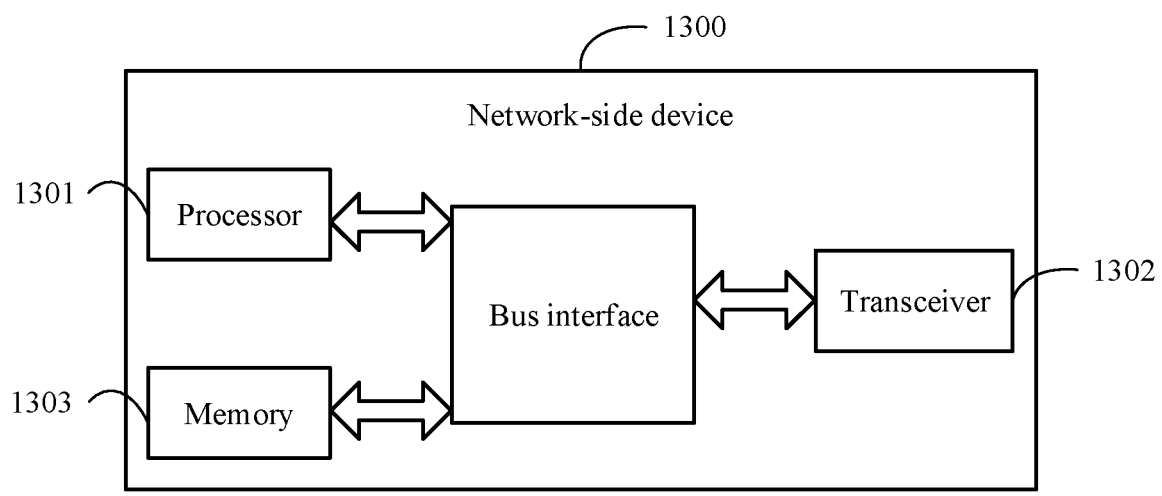
FIG. 8 is a schematic structural diagram of a network-side device according to an embodiment of this application.

FIG. 8 is a structural diagram of a network-side device (target node or source node) according to an embodiment of this application, and the network-side device is capable of implementing details of the information receiving method described above, with the same effects achieved. As shown in FIG. 8, the network-side device 1300 includes a processor 1301, a transceiver 1302, a memory 1303, and a bus interface.

The processor 1301 is configured to read a program in the memory 1303 to perform the following processes:

obtaining a mapping relationship between GTP-U sequence numbers of N data packets sent by a source node and source PDCP sequence numbers assigned to the N data packets by the source node, where N is an integer greater than or equal to 1; and performing data retransmission based on the mapping relationship.

Alternatively, the processor 1301 is configured to read a program in the memory 1303 to perform the following process:

sending, to a target node, GTP-U sequence numbers of N data packets and source PDCP sequence numbers assigned to the N data packets by the source node, where N is an integer greater than or equal to 1.

In this embodiment of this application, in the process of handover of the terminal from one multicast cell to another multicast cell, the target node performs data retransmission based on the mapping relationship between GTP-U sequence numbers and source PDCP sequence numbers of data packets, so as to reduce data loss for the terminal during handover and further meet service requirements of multicast services, resolving the problem of data loss for the terminal during handover.

In FIG. 8, a bus architecture may include any quantity of interconnected buses and bridges, specifically for interconnecting various circuits of one or more processors represented by the processor 1301 and a memory represented by the memory 1303. The bus architecture may further interconnect various other circuits such as a peripheral device, a voltage regulator, and a power management circuit. These are all well known in the art, and therefore are not further described in this specification. The bus interface provides an interface. The transceiver 1302 may be a plurality of components, that is, the transceiver 1302 includes a transmitter and a receiver, and provides a unit for communicating with various other apparatuses on a transmission medium.

Figure 9:
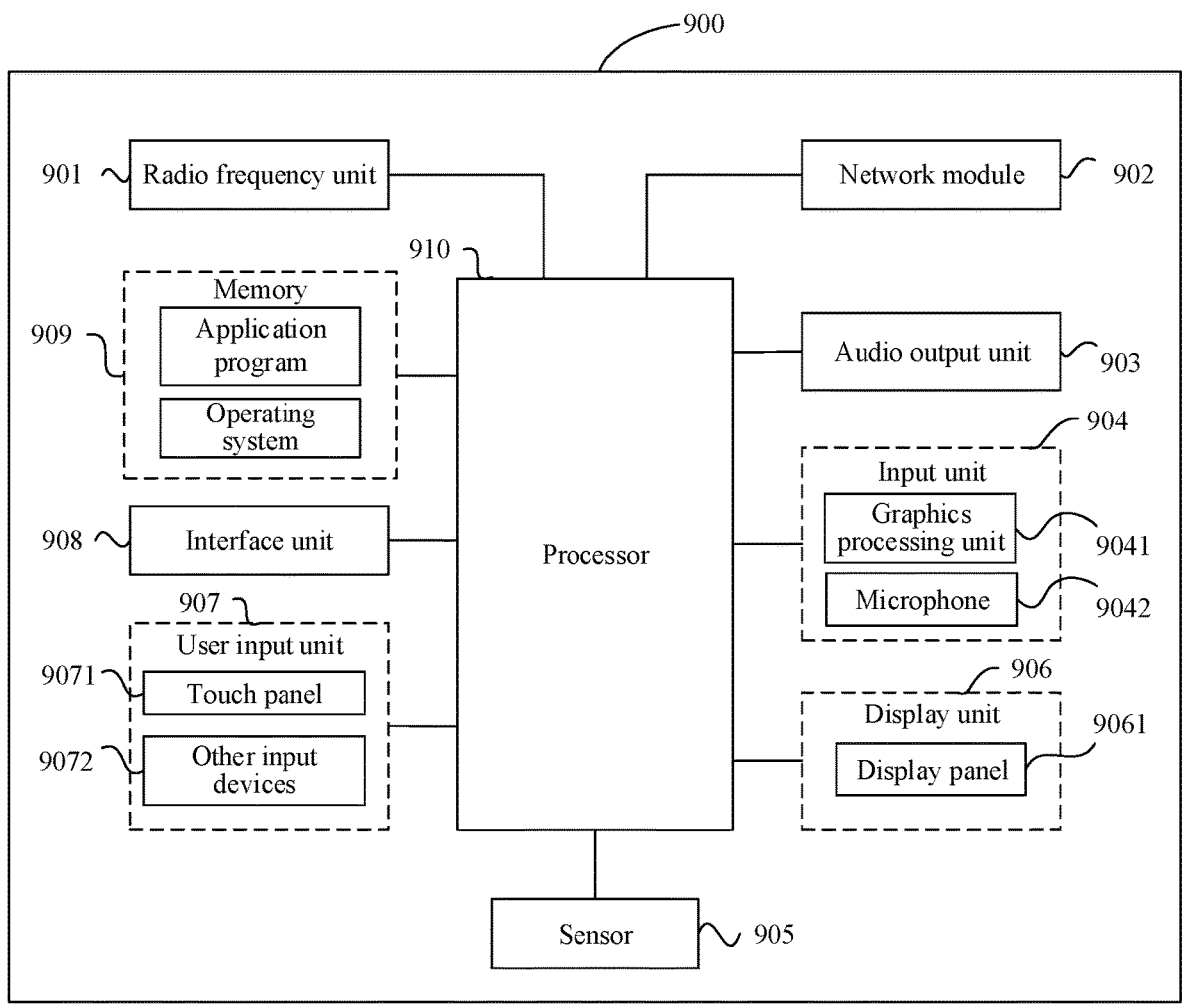
FIG. 9 is a schematic structural diagram of a terminal according to an embodiment of this application.

FIG. 9 is a schematic diagram of a hardware structure of an electronic device for implementing the embodiments of this application.

The electronic device 900 includes but is not limited to components such as a radio frequency unit 901, a network module 902, an audio output unit 903, an input unit 904, a sensor 905, a display unit 906, a user input unit 907, an interface unit 908, a memory 909, and a processor 910.

A person skilled in the art can understand that the electronic device 900 may further include a power supply (for example, a battery) supplying power to all components, and the power supply may be logically connected to the processor 910 through a power management system. In this way, functions such as charge management, discharge management, and power consumption management are implemented by using the power management system. The structure of the electronic device shown in FIG. 9 does not constitute any limitation on the electronic device. The electronic device may include more or fewer components than those shown in the figure, or a combination of some components, or the components disposed differently. Details are not described herein.

The radio frequency unit 901 is configured to: after the terminal is handed over to a target node, receive a data packet that is retransmitted by the target node based on a mapping relationship between GTP-U sequence numbers and source PDCP sequence numbers of data packets; where the source PDCP sequence number of the data packet is a PDCP sequence number assigned to the data packet by a source node.

In this embodiment of this application, in the process of handover of the terminal from one multicast cell to another multicast cell, the target node performs data retransmission based on the mapping relationship between GTP-U sequence numbers and source PDCP sequence numbers of data packets, so as to reduce data loss for the terminal during handover and further meet service requirements of multicast services, resolving the problem of data loss for the terminal during handover.

It should be understood that in this embodiment of this application, the radio frequency unit 901 may be configured to receive and send information, or to receive and send a signal in a call process, and specially, after receiving downlink data from a base station, send the downlink data to the processor 910 for processing; and also send uplink data to the base station. Generally, the radio frequency unit 901 includes but is not limited to an antenna, at least one amplifier, a transceiver, a coupler, a low noise amplifier, a duplexer, and the like. In addition, the radio frequency unit 901 may also communicate with a network and other devices via a wireless communications system.

The electronic device provides a user with wireless broadband internet access through the network module 902, for example, helping the user to transmit and receive e-mails, browse web pages, and access streaming media.

The audio output unit 903 may convert audio data received by the radio frequency unit 901 or the network module 902 or stored in the memory 909 into an audio signal and output the audio signal as a sound. Furthermore, the audio output unit 903 may also provide audio output (for example, a call signal received sound or a message received sound) related to a specific function performed by the electronic device 900. The audio output unit 903 includes a speaker, a buzzer, a receiver, and the like.

The input unit 904 is configured to receive an audio or video signal. The input unit 904 may include a graphics processing unit (GPU) 9041 and a microphone 9042. The graphics processing unit 9041 processes image data of a still picture or a video obtained by an image capture apparatus (for example, a camera) in an image capture mode or a video capture mode. A processed image frame may be displayed on the display unit 906. The image frame processed by the graphics processing unit 9041 may be stored in the memory 909 (or another storage medium) or be transmitted by the radio frequency unit 901 or the network module 902. The microphone 9042 is capable of receiving sounds and processing such sounds into audio data. The processed audio data may be converted in a telephone call mode into a format that can be transmitted by the radio frequency unit 901 to a mobile communications base station, for outputting.

The electronic device 900 may further include at least one sensor 905, for example, an optical sensor, a motion sensor, and other sensors. Specifically, the optical sensor may include an ambient light sensor and a proximity sensor. The ambient light sensor may adjust luminance of the display panel 9061 based on brightness of ambient light, and the proximity sensor may turn off the display panel 9061 and/or backlight when the electronic device 900 moves close to an ear. As a type of motion sensor, an accelerometer sensor can detect magnitudes of accelerations in all directions (usually three axes), can detect a magnitude and a direction of gravity when the electronic device is in a static state, and can be applied to posture recognition (such as screen switching between portrait and landscape, related games, and magnetometer posture calibration) of the electronic device, functions related to vibration recognition (such as pedometer and tapping), and the like. The sensor 905 may also include a fingerprint sensor, a pressure sensor, an iris sensor, a molecular sensor, a gyroscope, a barometer, a hygrometer, a thermometer, an infrared sensor, and the like. Details are not described herein.

The display unit 906 is configured to display information input by the user or information provided to the user. The display unit 906 may include the display panel 9061. The display panel 9061 may be configured in a form of a liquid crystal display (LCD), an organic light-emitting diode (OLED), or the like.

The user input unit 907 may be configured to receive input digit or character information and generate key signal input related to user setting and function control of the user equipment. Specifically, the user input unit 907 may include a touch panel 9071 and other input devices 9072. The touch panel 9071 is also referred to as a touchscreen and can collect a touch operation (such as an operation performed by the user on the touch panel 9071 or near the touch panel 9071 with a finger or by using any proper object or accessory such as a stylus) of the user on or near the touch panel 9071. The touch panel 9071 may include two parts: a touch detection apparatus and a touch controller. The touch detection apparatus detects a touch azimuth of a user, detects a signal brought by a touch operation, and transmits the signal to the touch controller. The touch controller receives touch information from the touch detection apparatus, converts the touch information into touchpoint coordinates, and transmits the touchpoint coordinates to the processor 910, and can receive a command transmitted by the processor 910 and execute the command. In addition, the touch panel 9071 may be implemented in a plurality of forms, for example, as a resistive, capacitive, infrared, or surface acoustic wave touch panel. The user input unit 907 may further include the other input devices 9072 in addition to the touch panel 9071. Specifically, the other input devices 9072 may include but are not limited to a physical keyboard, a function key (such as a volume control key or an on/off key), a trackball, a mouse, and a joystick. Details are not described herein.

Further, the touch panel 9071 may cover the display panel 9061. When detecting a touch operation on or near the touch panel 9071, the touch panel 9071 transmits the touch operation to the processor 910 to determine a type of a touch event. Then, the processor 910 provides a corresponding visual output on the display panel 9061 based on the type of the touch event. Although in FIG. 9, the touch panel 9071 and the display panel 9061 act as two independent parts to implement input and output functions of the electronic device, in some embodiments, the touch panel 9071 and the display panel 9061 may be integrated to implement the input and output functions of the electronic device. This is not specifically limited herein.

The interface unit 908 is an interface between an external apparatus and the electronic device 900. For example, the external apparatus may include a wired or wireless headphone port, an external power (or battery charger) port, a wired or wireless data port, a memory card port, a port for connecting an apparatus provided with a recognition module, an audio input/output (I/O) port, a video I/O port, an earphone port, and the like. The interface unit 908 may be configured to: receive input (for example, data information and power) from the external apparatus, and transmit the received input to one or more elements in the electronic device 900, or may be configured to transmit data between the electronic device 900 and the external apparatus.

The memory 909 may be configured to store software programs and various data. The memory 909 may mainly include a program storage area and a data storage area. The program storage area may store an operating system, and an application program required by at least one function (for example, a sound playback function or an image playback function). The data storage area may store data (for example, audio data or a phone book) created according to use of the mobile phone. In addition, the memory 909 may include a high-speed random access memory, and may further include a non-volatile memory such as at least one disk storage device, a flash memory device, or another volatile solid-state storage device.

The processor 910 is a control center of the electronic device, and is connected to all components of the electronic device by using various interfaces and lines. By running or executing a software program and/or module that is stored in the memory 909 and calling data stored in the memory 909, the processor 910 executes various functions of the electronic device and processes data, so as to perform overall monitoring on the electronic device. The processor 910 may include one or more processing units. Optionally, the processor 910 may integrate an application processor and a modem processor. The application processor mainly processes the operating system, a user interface, an application program, and the like. The modem processor mainly processes wireless communication. It can be understood that the modem processor may alternatively be not integrated in the processor 910.

The electronic device 900 may further include the power supply (such as a battery) for supplying power to the components. Optionally, the power supply may be logically connected to the processor 910 through a power management system. In this way, functions such as charge management, discharge management, and power consumption management are implemented by using the power management system.

In addition, the electronic device 900 includes some functional modules that are not shown, details of which are not described herein.

An embodiment of the present application further provides a readable storage medium, where a program or an instruction is stored in the readable storage medium. When the program or the instruction is executed by a processor, the processes of the foregoing data retransmission method embodiment can be implemented, with the same technical effects achieved. To avoid repetition, details are not described herein again.

The processor is a processor in the electronic device described in the foregoing embodiment. The readable storage medium includes a computer-readable storage medium, for example, a computer read-only memory (ROM), a random access memory (RAM), a magnetic disk, or an optical disc.

An embodiment of this application further provides a chip, where the chip includes a processor and a communications interface, the communications interface is coupled to the processor, and the processor is configured to run a program or an instruction to implement the foregoing data retransmission method embodiments, with the same technical effects achieved. To avoid repetition, details are not repeated herein.

It should be understood that the chip mentioned in this embodiment of this application may also be referred to as a system-on-chip, a system chip, a system-on-a-chip, a system on a chip, or the like.

An embodiment of this application further provides an electronic device, configured to perform the processes of the foregoing data retransmission method embodiment, with the same technical effects achieved. To avoid repetition, details are not described herein.

An embodiment of this application further provides a data retransmission apparatus, configured to perform the processes of the foregoing data retransmission method embodiment, with the same technical effects achieved. To avoid repetition, details are not described herein.

An embodiment of this application further provides a computer program product, and the computer program product is executed by at least one processor to perform the processes of the foregoing data retransmission method embodiment, with the same technical effects achieved. To avoid repetition, details are not described herein.

It should be noted that in this specification, the term "comprise", "include", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element. Furthermore, it should be noted that, in the scope of the method and apparatus in the embodiments of this application, execution of the functions is not limited to the order shown or described, and the functions may alternatively be executed in a substantially simultaneous manner or in a reverse order. For example, the described method may be performed in an order different from that described, and steps may be added, omitted, or combined. In addition, features described with reference to some examples may be combined in other examples.

According to the description of the foregoing implementations, persons skilled in the art can clearly understand that the method in the foregoing embodiments may be implemented by software in addition to a necessary universal hardware platform or by hardware only. In most cases, the former is a more preferred implementation. Based on such an understanding, the technical solutions of this application essentially or the part contributing to the prior art may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this application.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data retransmission method, performed by a target node and comprising:
    obtaining a mapping relationship between General Packet Radio Service (GPRS) tunnelling protocol user plane (GTP-U) sequence numbers of N data packets sent by a source node and source packet data convergence protocol (PDCP) sequence numbers assigned to the N data packets by the source node, wherein N is an integer greater than or equal to 1; and
    performing data retransmission based on the mapping relationship;
    wherein before the performing data retransmission based on the mapping relationship, the method further comprises:
    receiving, from a terminal, reception status indication information of the terminal for a data packet sent by the source node, wherein the reception status indication information is used to indicate a source PDCP sequence number of at least one first data packet, and the first data packet is a data packet that has not been received by the terminal before node switching; and
    the performing retransmission based on the mapping relationship comprises:
    performing data transmission based on the source PDCP sequence number of the at least one first data packet and the mapping relationship.

2. The method according to claim 1, wherein the obtaining a mapping relationship between GTP-U sequence numbers of N data packets sent by a source node and source PDCP sequence numbers assigned to the N data packets by the source node comprises:
    receiving status indication information sent by the source node, wherein the status indication information comprises at least one of the following information:
    a GTP-U sequence number and a source PDCP sequence number that are of a latest data packet sent by the source node when the source node is handing over a terminal to the target node;
    a GTP-U sequence number and a source PDCP sequence number that are of the $1^{st}$ data packet to be sent by the source node when the source node determines to hand over the terminal to the target node; and
    a GTP-U sequence number and a source PDCP sequence number that are of a packet not received by the terminal before handover.

3. The method according to claim 2, wherein before the performing data retransmission based on the mapping relationship, the method further comprises:
    receiving data packets forwarded by the source node in an order of the GTP-U sequence numbers of the N data packets;
    wherein the receiving N data packets forwarded by the source node in an order of the GTP-U sequence numbers of the N data packets comprises:
    receiving data packets forwarded by the source node from a second data packet in an order of the GTP-U sequence numbers of the N data packets, wherein
    the second data packet is a data packet next to the latest data packet sent by the source node when the terminal is being handed over to the target node; or
    the second data packet is the $1^{st}$ data packet to be sent by the source node when the terminal is being handed over to the target node; or
    the second data packet is the $1^{st}$ data packet that has not been received by the terminal before handover.

4. The method according to claim 3, wherein the method further comprises:
    based on a cached data status of the target node, sending a data-forwarding stop indication to the source node; and/or
    wherein the performing data retransmission based on the mapping relationship comprises:
    based on the mapping relationship, performing data retransmission sequentially from the data packet next to the latest data packet sent by the source node when the terminal is being handed over to the target node;
    or,
    based on the mapping relationship, performing data retransmission sequentially from the $1^{st}$ data packet to be sent by the source node when the terminal is being handed over to the target node.

5. The method according to claim 1, wherein before the obtaining a mapping relationship between GTP-U sequence numbers of N data packets sent by a source node and source PDCP sequence numbers assigned to the N data packets by the source node, the method further comprises:
    receiving a handover request message sent by the source node, wherein the handover request message carries at least one of a multicast service identifier and first indication information indicating that the source node requests to forward multicast service data; and
    sending a handover response message to the source node, wherein the handover response message carries at least one of the following information:
    a multicast service identifier;
    second indication information indicating that the target node agrees to forward the multicast service data;
    first retransmission indication information indicating whether the target node is to perform data retransmission;
    second retransmission indication information indicating a resource for data retransmission to be performed by the target node;
    hybrid automatic repeat request (HARQ) process information for data retransmission; and
    configuration information of common resources for multicast data transmission in multicast mode.

6. The method according to claim 1, wherein before the performing data retransmission based on the mapping relationship, the method further comprises:
    establishing a connection to a terminal that has received a handover command message sent by the source node, wherein the handover command message carries at least one of the following information:
    a multicast service identifier;
    first retransmission indication information indicating whether the target node is to perform data retransmission;
    second retransmission indication information indicating a resource for data retransmission to be performed by the target node;

hybrid automatic repeat request (HARQ) process information for data retransmission; and
configuration information of common resources for multicast data transmission in multicast mode.

7. A data retransmission method, performed by a source node and comprising:
sending, to a target node, General Packet Radio Service (GPRS) tunnelling protocol user plane (GTP-U) sequence numbers of N data packets and source packet data convergence protocol (PDCP) sequence numbers assigned to the N data packets by the source node, wherein Nis an integer greater than or equal to 1;
wherein the sending, to a target node, GTP-U sequence numbers of N data packets and source PDCP sequence numbers assigned to the N data packets by the source node comprises:
sending status indication information to the target node, wherein the status indication information comprises: a GTP-U sequence number and a source PDCP sequence number that are of a latest data packet sent by the source node when the source node is handing over a terminal to the target node.

8. The method according to claim 7, wherein the status indication information further comprises at least one of the following information:
a GTP-U sequence number and a source PDCP sequence number that are of the 1$^{st}$ data packet to be sent by the source node when the source node determines to hand over the terminal to the target node; and
a GTP-U sequence number and a source PDCP sequence number that are of a packet not received by the terminal before handover.

9. The method according to claim 7, further comprising:
forwarding data packets in an order of the GTP-U sequence numbers of the N data packets to the target node.

10. The method according to claim 9, wherein the forwarding data packets in an order of the GTP-U sequence numbers of the N data packets to the target node comprises:
forwarding data packets from a second data packet in the sequence of the GTP-U sequence numbers to the target node, wherein
the second data packet is a data packet next to the latest data packet sent by the source node when a terminal is being handed over to the target node; or
the second data packet is the 1$^{st}$ data packet to be sent by the source node when the terminal is being handed over to the target node; or
the second data packet is the 1$^{st}$ data packet that has not been received by the terminal before handover.

11. The method according to claim 7, wherein before the sending, to a target node, GTP-U sequence numbers of N data packets and source PDCP sequence numbers assigned to the N data packets by the source node, the method further comprises:
sending a handover request message to the target node, wherein the handover request message carries at least one of a multicast service identifier and first indication information indicating that the source node requests to forward multicast service data; and
receiving a handover response message sent by the target node, wherein the handover response message carries at least one of the following information:
a multicast service identifier;
second indication information indicating that the target node agrees to forward the multicast service data;
first retransmission indication information indicating whether the target node is to perform data retransmission;
second retransmission indication information indicating a resource for data retransmission to be performed by the target node;
hybrid automatic repeat request (HARQ) process information for data retransmission; and
configuration information of common resources for multicast data transmission in multicast mode; and
wherein the method further comprises:
sending a handover command message to a terminal, wherein the handover command message carries at least one of the following information:
a multicast service identifier;
first retransmission indication information indicating whether the target node is to perform data retransmission;
second retransmission indication information indicating a resource for data retransmission to be performed by the target node;
HARQ process information for data retransmission; and
configuration information of common resources for multicast data transmission in multicast mode.

12. The method according to claim 9, further comprising:
receiving a data-forwarding stop indication sent by the target node, and stopping data packet forwarding;
or,
stopping data packet forwarding in a case that a first timer expires and the source node has received no data-forwarding stop indication sent by the target node.

13. A data retransmission method, performed by a terminal and comprising:
after being handed over to a target node, receiving, by the terminal, a data packet that is retransmitted by the target node based on a mapping relationship between General Packet Radio Service (GPRS) tunnelling protocol user plane (GTP-U) sequence numbers and source packet data convergence protocol (PDCP) sequence numbers of data packets; wherein
the source PDCP sequence number of the data packet is a PDCP sequence number assigned to the data packet by a source node;
wherein before the receiving a data packet that is retransmitted by the target node based on a mapping relationship between GTP-U sequence numbers and source PDCP sequence numbers of data packets, the method further comprises:
sending, to the target node, reception status indication information of the terminal for a data packet sent by the source node, wherein the reception status indication information is used to indicate a source PDCP sequence number of at least one first data packet, and the first data packet is a data packet that has not been received by the terminal before node switching.

14. The method according to claim 13, wherein the receiving a data packet that is retransmitted by the target node based on a mapping relationship between GTP-U sequence numbers of data packets and source PDCP sequence numbers comprises:
based on a first protocol stack of the source node, receiving the data packet retransmitted by the target node;
or
wherein the receiving a data packet that is retransmitted by the target node based on a mapping relationship between GTP-U sequence numbers of data packets and source PDCP sequence numbers comprises:

receiving, by using a terminal-dedicated resource or a temporary scheduling resource, the data packet retransmitted by the target node.

15. The method according to claim 13, wherein before the receiving a data packet that is retransmitted by the target node based on a mapping relationship between GTP-U sequence numbers and source PDCP sequence numbers of data packets, the method further comprises:

receiving a handover command message sent by the source node; and establishing a connection to the target node based on the handover command message, wherein the handover command message carries at least one of the following information:

a multicast service identifier;

first retransmission indication information indicating whether the target node is to perform data retransmission;

second retransmission indication information indicating a resource for data retransmission to be performed by the target node;

hybrid automatic repeat request (HARQ) process information for data retransmission; and configuration information of common resources for multicast data transmission in multicast mode; and wherein the method further comprises at least one of the following:

keeping a receiving PDCP entity unchanged, wherein the receiving PDCP entity is corresponding to the source node for a multicast service indicated by the handover command message;

reestablishing a receiving radio link control (RLC) entity corresponding to multicast mode of the multicast service indicated by the handover command message; and triggering to feed back a status report, wherein the status report is used to indicate a reception status of the data packet on the terminal side.

16. The method according to claim 13, wherein after the receiving a data packet that is retransmitted by the target node based on a mapping relationship between GTP-U sequence numbers and source PDCP sequence numbers of data packets, the method further comprises:

receiving third indication information sent by the target node, wherein the third indication information is used to indicate that data retransmission by the target node has ended; and wherein the method further comprises:

stopping monitoring a temporary scheduling resource, wherein the temporary scheduling resource is used for data retransmission by the target node.

17. The method according to claim 16, further comprising at least one of the following:

releasing a receiving PDCP entity corresponding to the source node for a multicast service indicated by the handover command message;

releasing a receiving RLC entity corresponding to the source node for the multicast service indicated by the handover command message;

indicating that a receiving PDCP entity corresponding to the target node for the multicast service indicated by the handover command message is able to submit data to an upper layer in sequence; and indicating that a receiving RLC entity corresponding to the target node for the multicast service indicated by the handover command message is able to submit data to an upper layer in sequence.

18. The method according to claim 13, wherein the receiving a data packet that is retransmitted by the target node based on a mapping relationship between GTP-U sequence numbers of data packets and source PDCP sequence numbers comprises:

receiving data packets that are retransmitted based on the mapping relationship from a first data packet with a smallest PDCP sequence number in the at least one first data packet.

* * * * *